United States Patent [19]

Ohsawa

[11] Patent Number: 4,974,012
[45] Date of Patent: Nov. 27, 1990

[54] DISPLAY DEVICE FOR AUTOMATIC EXPOSURE BRACKETING SHOOTING

[75] Inventor: Toshifumi Ohsawa, Tokyo, Japan

[73] Assignee: Canon Kabushiki Kaisha, Tokyo, Japan

[21] Appl. No.: 370,986

[22] Filed: Jun. 23, 1989

[30] Foreign Application Priority Data

Jun. 28, 1988 [JP] Japan .................................. 63-158202
Jun. 28, 1988 [JP] Japan .................................. 63-158203
Jun. 28, 1988 [JP] Japan .................................. 63-158205

[51] Int. Cl.$^5$ ............................................. G03B 17/18
[52] U.S. Cl. .................................................... 354/474
[58] Field of Search ............ 354/412, 475, 474, 289.1, 354/289.12

[56] References Cited

U.S. PATENT DOCUMENTS

| | | | |
|---|---|---|---|
| 4,734,727 | 3/1988 | Takemae | 354/412 |
| 4,812,870 | 3/1989 | Kawamura | 354/412 |
| 4,837,596 | 6/1989 | Kawamura | 354/442 |
| 4,862,205 | 8/1989 | Kawamura | 354/412 |

Primary Examiner—W. B. Perkey
Attorney, Agent, or Firm—Fitzpatrick, Cella, Harper & Scinto

[57] ABSTRACT

A display device is provided for automatic exposure bracketing. In particular, a display is provided for each exposure value for all frames to be used in the automatic exposure bracketing and the exposure compensation value set by an exposure compensation value setting circuit using the same indicator. When performing the above-described display, the set compensation value is displayed as the exposure value of one frame for automatic exposure bracketing, and the exposure values of the other frames are displayed in correlation as the amounts of deviation from that compensation value.

6 Claims, 16 Drawing Sheets

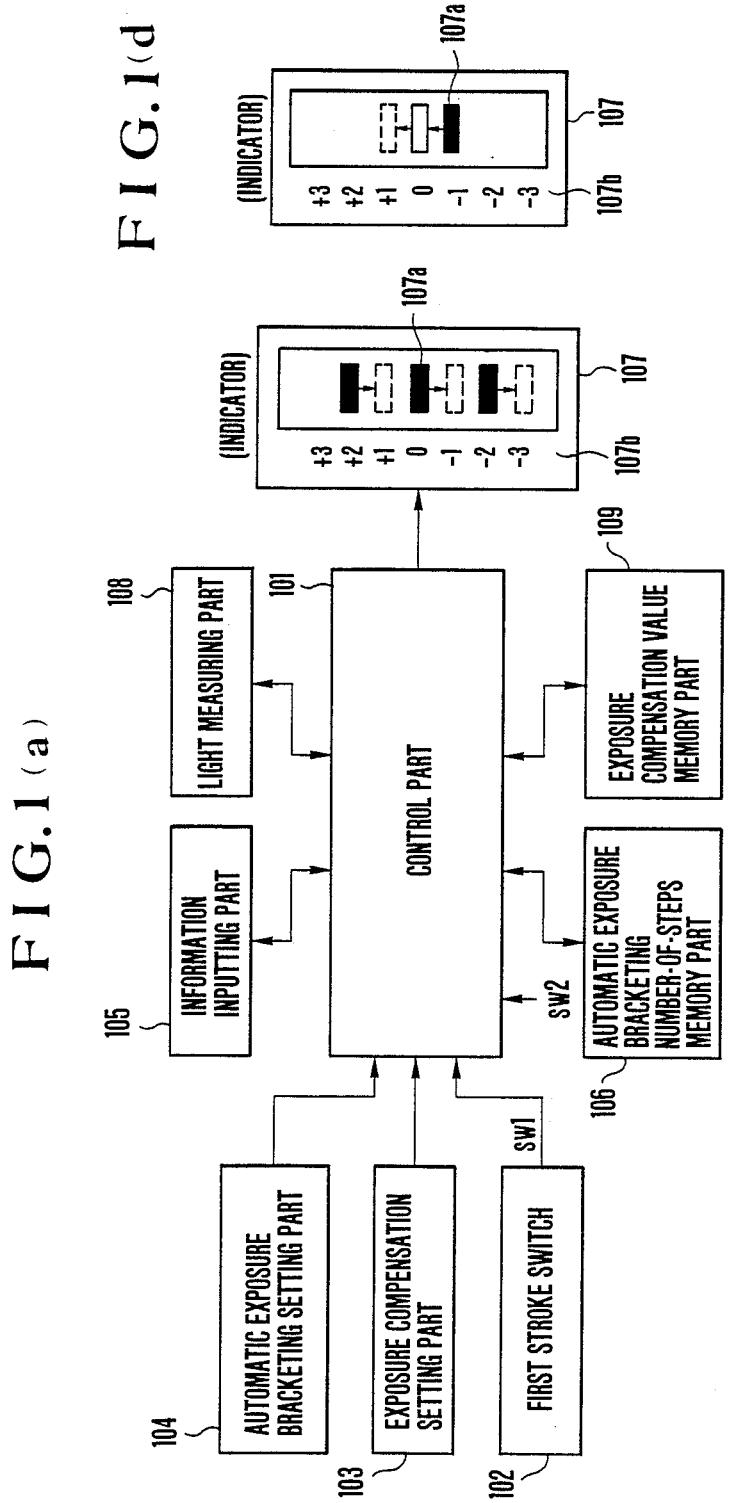

FIG. 10(a)

| EXPOSURE COMPENSATION VALUE | 5-BIT DATA | | | | |
|---|---|---|---|---|---|
| | C4 | C3 | C2 | C1 | C0 |
| +2.0 | 0 | 0 | 1 | 0 | 0 |
| +1.5 | 0 | 0 | 0 | 1 | 1 |
| +1.0 | 0 | 0 | 0 | 1 | 0 |
| +0.5 | 0 | 0 | 0 | 0 | 1 |
| 0.0 | 0 | 0 | 0 | 1 | 0 |
| −0.5 | 1 | 1 | 1 | 1 | 1 |
| −1.0 | 1 | 1 | 1 | 1 | 0 |
| −1.5 | 1 | 1 | 1 | 0 | 1 |
| −2.0 | 1 | 1 | 1 | 0 | 0 |

FIG. 10(b)

| AUTOMATIC EXPOSURE BRACKETING NUMBER-OF-STEPS | 3-BIT DATA | | |
|---|---|---|---|
| | A2 | A1 | A0 |
| 2.0 | 1 | 0 | 0 |
| 1.5 | 0 | 1 | 1 |
| 1.0 | 0 | 1 | 0 |
| 0.5 | 0 | 0 | 1 |
| 0.0 | 0 | 0 | 0 |

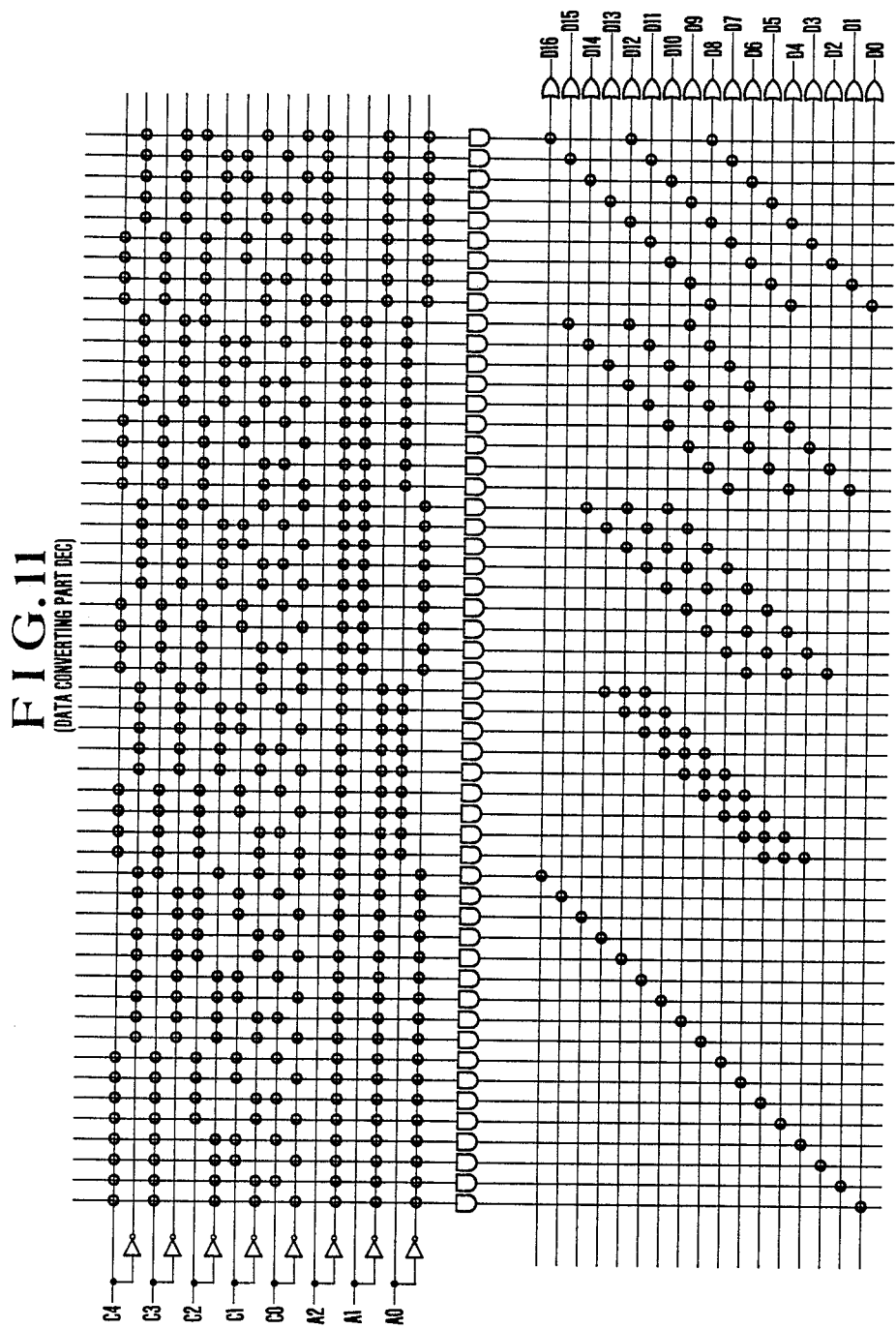
FIG.11 (DATA CONVERTING PART DEC)

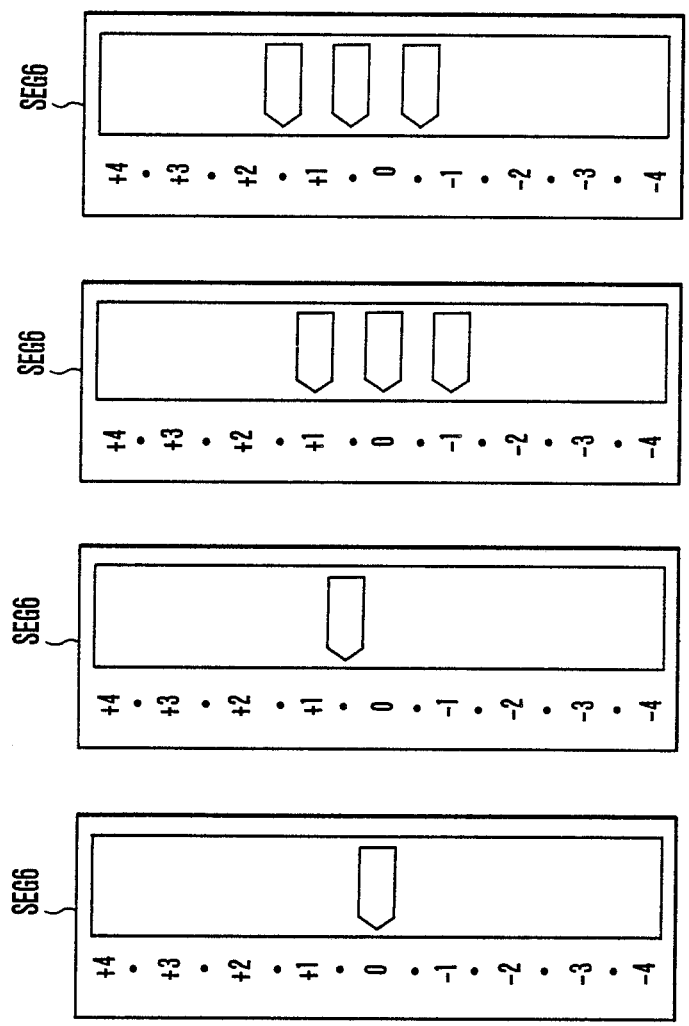

FIG. 13

| CASE | CONDITION | | RESULT OF PROCESSING | | |
|---|---|---|---|---|---|
| | SW1 ON/OFF | CONTENT OF RGAEBN | CONTENT OF RGCOMPD | CONTENT OF RGAEBD | EXPOSURE CONDITION ACCORDING TO CONTENTS OF RGTv AND RGAv |
| 1 | ON | 3 | RGCOMP − RGAEB | 0 | UNDEREXPOSURE BY AUTOMATIC EXPOSURE BRACKETING NUMBER-OF-STEPS RELATIVE TO STANDARD EXPOSURE |
| 2 | ON | 2 | SAME AS RGCOMP | 0 | STANDARD EXPOSURE |
| 3 | ON | 1 | RGCOMP + RGAEB | 0 | OVEREXPOSURE BY AUTOMATIC EXPOSURE BRACKETING NUMBER-OF-STEPS RELATIVE TO STANDARD EXPOSURE |
| 4 | OFF | 3 | SAME EXPOSURE COMPENSATION VALUE AS CONTENT OF RGCOMP | SAME VALUE OF AUTOMATIC EXPOSURE BRACKETING NUMBER-OF-STEPS AS CONTENT OF RGAEB | DSPLAY OF STANDARD EXPOSURE |
| 5 | OFF | 2 | SAME EXPOSURE COMPENSATION VALUE AS CONTENT OF RGCOMP | SAME VALUE OF AUTOMATIC EXPOSURE BRACKETING NUMBER-OF-STEPS AS CONTENT OF RGAEB | DSPLAY OF STANDARD EXPOSURE |
| 6 | OFF | 1 | SAME EXPOSURE COMPENSATION VALUE AS CONTENT OF RGCOMP | SAME VALUE OF AUTOMATIC EXPOSURE BRACKETING NUMBER-OF-STEPS AS CONTENT OF RGAEB | DSPLAY OF STANDARD EXPOSURE |

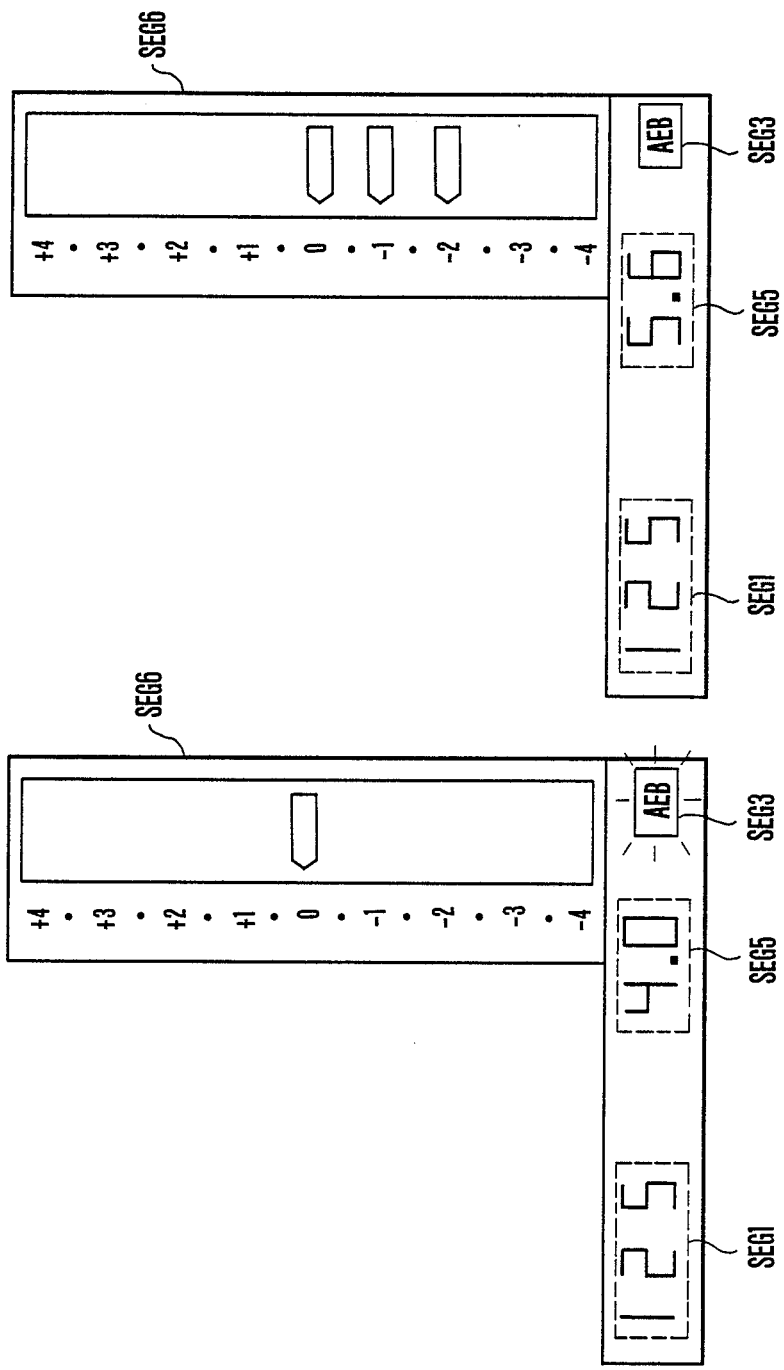

DISPLAY DEVICE FOR AUTOMATIC EXPOSURE BRACKETING SHOOTING

BACKGROUND OF THE INVENTION

1. Field of the Invention:

This invention relates to improvements of a camera having an automatic exposure bracketing function that enables continuous shooting to go on while simultaneously varying the exposure value automatically.

Incidentally, what has been called here the "automatic exposure bracketing" function refers to that for the given exposure value to the camera (in the case of automatic exposure, the exposure control value to be derived automatically from the object brightness and the film sensitivity, or in the case of manual exposure, the shutter time and aperture value set by the photographer), the camera offsets it. Simply speaking, this means that when photographing a certain object, a series of continuous shots are taken with a variation of the exposure value to some number of successive steps. It is this operation that the camera of that function automatically performs.

2. Description of the Related Art:

In the conventional camera of this kind, to make it simple to set in the automatic exposure bracketing mode, it is common that a number of exposure values are distributed over a range with the correct one the camera itself has derived by computation at the center, or equally on the underexposure side and on the overexposure side (for example, −0.5, 0, +0.5), and that the photographer needs only to do setting of a desired value of that number of steps (in the aforesaid instance, 0.5 steps). By the way, in view of the photographic situation, the photographer sometimes wishes either a one-sided distribution of the series of exposure values as only on the underexposure side or on the overexposure side (for example, −1.5, −1.0, −0.5, or +0.5, +1.0, +1.5), or a shift of the center of the distribution. For such a case, the realization is made possible by relying on the setting of an exposure compensation value.

In its indication part, however, because the exposure compensation value and the automatic exposure bracketing number-of-steps are displayed independently of each other, it is difficult to understand what results the above-described one-sided setting or center-shifted setting is to effect. Therefore, the display device of the conventional camera has a possibility that the photographer would perform different settings from his own intention.

SUMMARY OF THE INVENTION

One aspect of the application is to provide a display device which displays the relationship of the set exposure compensation value information and the information representing every automatic exposure bracketing number-of-steps over all the number of times of automatic exposure bracketing shooting by using the same indication part in such a form that the mutual relationship is sufficiently understandable.

Another aspect of the application is, under the aforesaid object, to provide a display device which causes a bar indication part to display the relationship of the exposure compensation value and the automatic exposure bracketing number-of-steps information.

A further aspect of the application is, under the aforesaid object, to provide a display device having a first mode in which the relationship of the exposure compensation value and every automatic exposure bracketing number-of-steps over all the number of times of automatic exposure bracketing shooting and a second mode in which by each time of automatic exposure bracketing shooting, the automatic exposure bracketing number-of-steps for the next time of automatic exposure bracketing shooting and the control exposure value for that time are displayed, whereby the relationship of the information representing all the set automatic exposure bracketing number-of-steps and the exposure compensation value and, each time the automatic exposure bracketing shooting is carried out, the automatic exposure bracketing number-of-steps and the control exposure value which are to be carried out in that time of automatic exposure bracketing shooting, are displayed.

Other objects of the present invention will become clear from the following description of embodiments thereof.

BRIEF DESCRIPTION OF THE DRAWINGS

FIG. 1(a) is a block diagram illustrating an embodiment of the present invention.

FIG. 1(d) is an explanation diagram illustrating its display operation.

FIGS. 10(a) and 10(b) are tables illustrating an example of data of the exposure compensation value and the automatic exposure bracketing number-of-steps in one embodiment of the present invention.

FIG. 11 is an electrical circuit diagram of an example of construction of a data converting part DEC shown in FIG. 9.

FIGS. 12(a), 12(b), 12(c) and 12(d) are plan views of examples of display in the respective states of the indicator SEG6 shown in FIG. 9.

FIG. 13 is a table summarizing the results of processing at the time of each case in one embodiment of the present invention.

FIGS. 14(a), 14(b), 14(c) and 14(d) are plan views illustrating examples of display in the respective states of the indicators SEG1, SEG3, SEG5 and SEG6 shown in FIG. 2.

DETAILED DESCRIPTION OF THE PREFERRED EMBODIMENTS

Figure 1B:
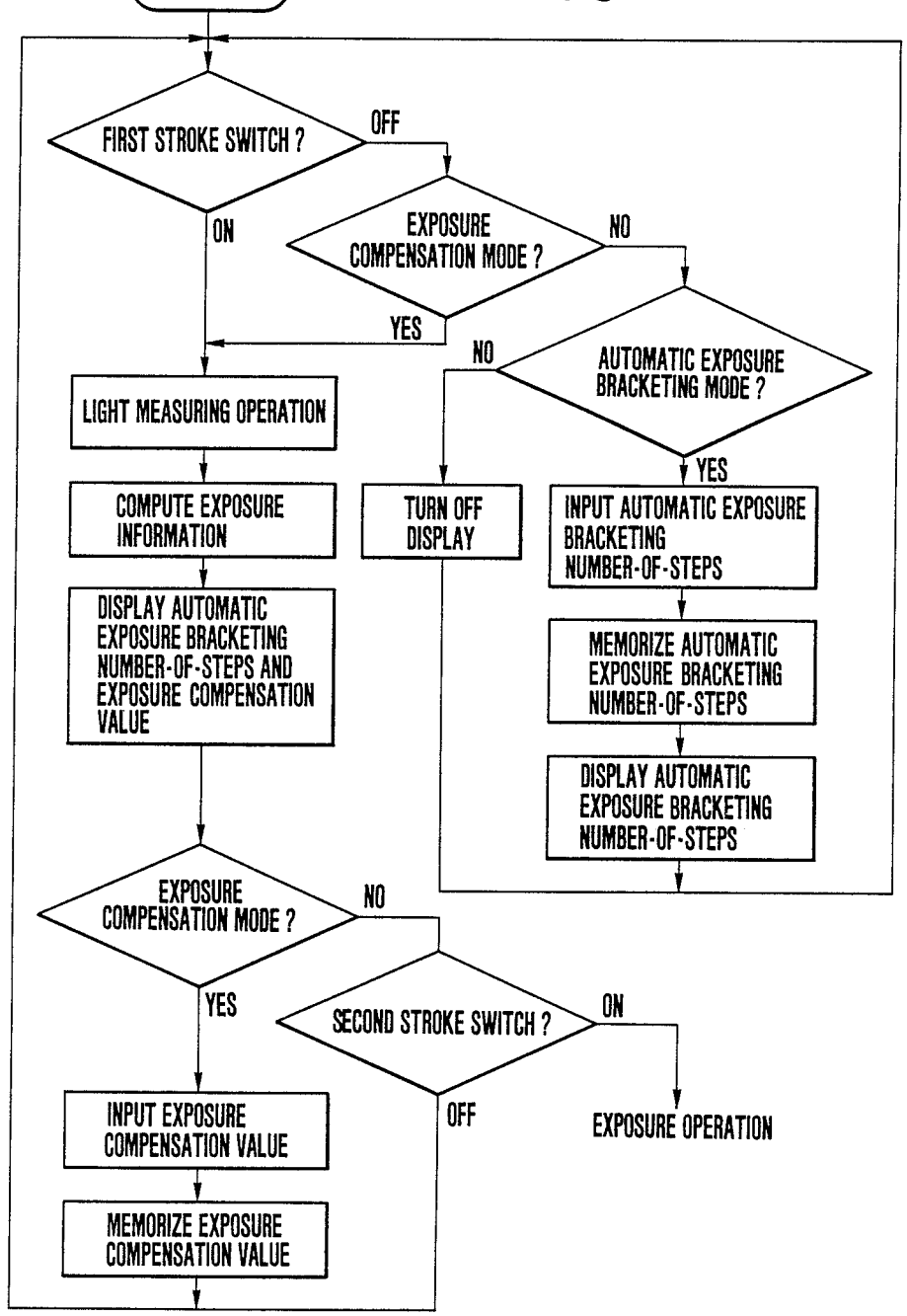
FIG. 1(b) is its flowchart.

In FIG. 1(a), there is shown the fundamental construction and arrangement of the parts of an embodiment of the invention. A flowchart for its operation is shown in FIG. 1(b).

When an electric power source is turned on, a control part 101 first examines the on-off state of a first stroke switch 102 which is responsive to the pushing operation of a release button. If it is in the "on" state, a light measuring operation is performed. If in the "off" state, on the other hand, whether or not the exposure compensation mode is set by an exposure compensation setting part 103 is examined. If this results in not setting of the exposure compensation mode, whether or not the automatic exposure bracketing mode is set by an automatic exposure bracketing setting part 104 is examined. Supposing here that the automatic exposure bracketing mode is set, the automatic exposure bracketing number-of-steps information received from an information inputting part 105 and set by the external operation of the photographer is read. Then, the automatic exposure bracketing number-of-steps information is memorized in an automatic exposure bracketing number-of-steps memory part 106 and displayed in an indicator 107. Then, the operations returns to the start position. In the present embodiment, the number of times of automatic exposure bracketing shooting is previously set to "3". So, if, for example, "2.0" is set by the photographer, the shooting with the exposure quantity of the underexposure side by "2.0" steps, the shooting with the correct exposure quantity for this time, and the shooting with the exposure quantity of the overexposure side by "2.0" steps, totally 3 times of shooting, take place.

Therefore, as a result of the foregoing setting, if "2.0" is set as the automatic exposure bracketing number-of-steps, the automatic exposure bracketing number-of-steps memory part 106 stores the information representing the values of "−2.0, 0, +2.0" in the number of steps. In the indicator 107 having a plurality of indication parts 107a arrayed in a bar graph like manner to commonly display both of the automatic exposure bracketing number-of-steps information and the exposure compensation value information and having an index part 107b arranged in confrontation to the plurality of indication parts 107a and representing a position (0) indicating correct exposure quantity and positions (−1, −2, −3, +1, +2, +3) indicating the exposure compensation quantities of the underexposure side and the overexposure side, therefore, such a display as shown in FIG. 1(a) is presented. In short, the ones of the indication parts 107a which have their places in registry with "+2", "0" and "−2" respectively of the index part 107b are lighted. Hence, on looking at that display at a glance, the photographer can easily know that the automatic exposure bracketing shooting will take place three times with the underexposure value by "2.0" steps, the correct exposure value (determined based on the light measuring operation to be described later) and the overexposure value by "2.0" steps.

If, after that, the exposure compensation mode is set by the exposure compensation setting part 103, similarly to the aforesaid event that the first stroke switch 102 has been turned on, the light measuring operation is performed. That is, a light measuring part 108 is immediately driven to carry out the light measuring operation. From the obtained light value information, a correct exposure value for this time is computed. Subsequently, the aforesaid indicator 107 is caused to display the respective current pieces of information. However, since, at this time point, the exposure compensation value information is not yet set, the aforesaid display remains presented without any change in the indicator 107. Then, whether or not the exposure compensation mode is in use is discriminated again. Because it is here that the exposure compensation mode has just been set, the exposure compensation value information received from the information inputting part 105 and set by the external manipulation of the photographer is read. The exposure compensation value information is stored in an exposure compensation value memory part 109. Then, the operation returns to the start position. Such a routine repeats itself.

Now, assuming that the aforesaid manipulation is to set "−1.0" as the exposure compensation value, then the exposure compensation value of "−1.0" is stored in the exposure compensation value memory part 109. As a result, the display on the indicator 107 changes to such a display as shown by broken lines in FIG. 1(a). That is, the display positions of all the previously set pieces of the automatic exposure bracketing number-of-steps information change each by one step toward the underexposure side. By this, it is made possible for the photographer to see at a glance what number of steps the exposure compensation is and how this varies the automatic exposure bracketing number-of-steps.

Figure 1C:
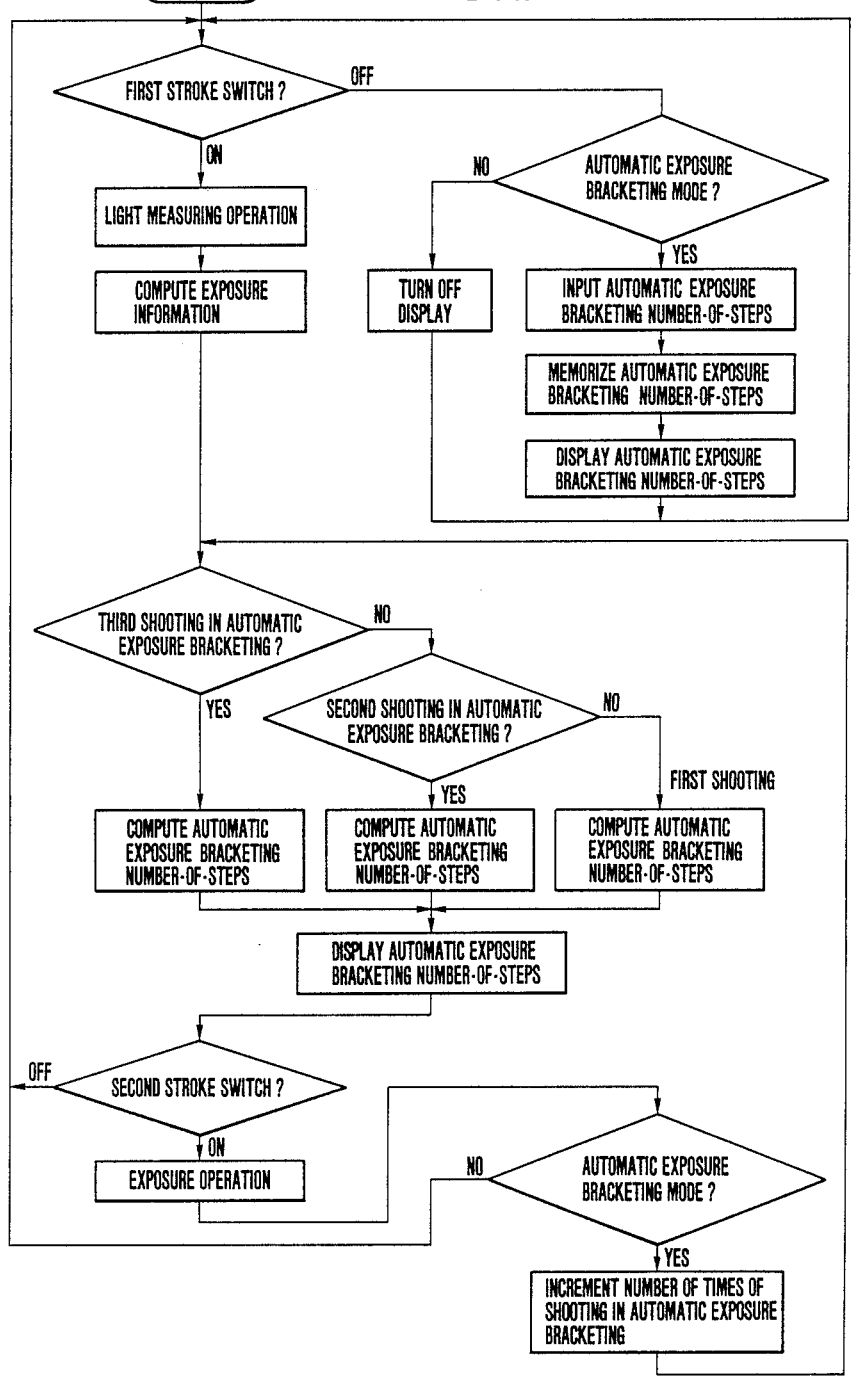
FIG. 1(c) is a flowchart illustrating another embodiment.

FIG. 1(c) is a flowchart showing another embodiment of the invention. The display device of FIG. 1(a) is assumed to operate according to this flowchart. The operation is explained as is in pursuit to the flow of FIG. 1(c). When the electric power source is turned on, the control part 101 first examines whether the release button has been pushed down, that is, whether the first stroke switch 102 is in the "on" or "off" state. If "on", the light measuring operation is performed. If "off", whether or not the automatic exposure bracketing mode is set by the automatic exposure bracketing setting part 104 is examined. Here, if the automatic exposure bracketing mode is in use, the automatic exposure bracketing number-of-steps information received from the information inputting part 105 and set by the external manipulation of the photographer is read. The automatic exposure bracketing number-of-steps information is stored in the automatic exposure bracketing number-of-steps memory part 106 and displayed on the indicator 107. Then, the operation returns to the start position. In this embodiment, the number of times of the automatic exposure bracketing shooting is previously determined to be "3". Assuming that, for example, "1.0" is set by the photographer, then the shooting with the exposure quantity of the underexposure side by "1.0" step, the shooting with the correct exposure quantity for this time, and the shooting with the exposure quantity of the overexposure side by "1.0" step, totaling the three times of shooting, will take place.

Therefore, supposing that the foregoing procedure results in setting "1.0" as the automatic exposure bracketing number-of-steps, then the number-of-steps information of "−1.0, 0, +1.0" is stored in the automatic exposure bracketing number-of-steps memory part 106. In the indicator 107 having the plurality of indication parts 107a arrayed in bar graph like manner to display the automatic exposure bracketing number-of-steps information and the index part 107b representing the position (0) indicating the correct exposure quantity and the positions (−1, −2, −3, +1, +2, +3) indicating the amounts of variation of the exposure from it to the underexposure side and to the overexposure side, therefore, the ones of the indication parts 107a which confront respectively the "+1", "0" and "−1" of the index part 107b are all lighted. Such a display is presented so long as the automatic exposure bracketing mode is set and a release wait actuation is not done. Hence, on looking at that display, the photographer can easily know that the automatic exposure bracketing shooting will take place three times with a variation of the exposure quantity through the underexposure value by 1.0 step, the correct exposure value (determined based on the light measuring operation to be described later) and the overexposure value by 1.0 step.

If a later change of the first stroke switch 102 to the "on" state, the light measuring operation is performed as has been described above. That is, the closure of the first stroke switch 102 is immediately followed by driving the light measuring part 108 to perform a light measuring operation. From the obtained light value information, a correct exposure value for this time is computed. Next, what number the time for now of the automatic exposure bracketing shooting is is discriminated in order to display the automatic exposure bracketing number-of-steps for the next time of the automatic exposure bracketing shooting. In this time point, the release button actuation is for the first automatic exposure bracketing shooting (for the first time). Therefore, the automatic exposure bracketing number-of-steps for this time is read out from the automatic exposure bracketing number-of-steps memory part 106, and such a display as shown in FIG. 1(d) is presented in the indicator 107. That is, the one of the indication parts 107a which is positioned in confrontation to "−1" of the index part 107b (i.e., the black painted area), is lighted.

Next, whether or not a second stroke switch SW2 has turned on is examined. If "on", the publicly known shooting operation is performed. When this ends, whether or not the automatic exposure bracketing mode is in operation is discriminated. If in the automatic exposure bracketing mode, the content of an automatic exposure bracketing shooting number-of-times counting part which is counting the number of times of the automatic exposure bracketing shooting is incremented by one. What number the time of the next automatic exposure bracketing shooting is is discriminated again. If this result shows that it is the second time, the automatic exposure bracketing number-of-steps for this time is read out from the automatic exposure bracketing number-of-steps memory part 106, and such a display as shown by the solid line in FIG. 1(d) is presented. That is, the one of the indication parts 107a which confronts "0" of the index part 107a is displayed. Also, if it is the last time of the automatic exposure bracketing shooting, such a display as shown by the broken line in FIG. 1(d) is presented. That is, the one of the indication parts 107a which confronts "+1" of the index part 107b is displayed.

Figure 6:
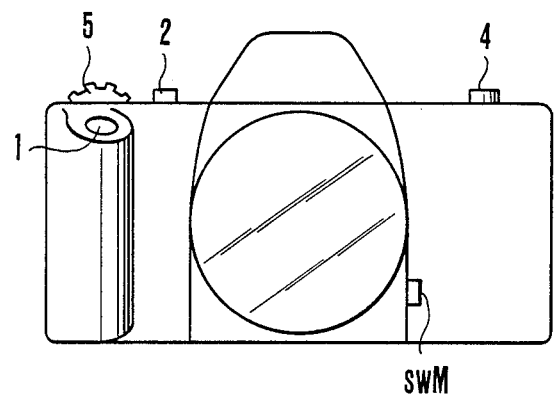
FIG. 6 is a front view of the camera.
Figure 7:
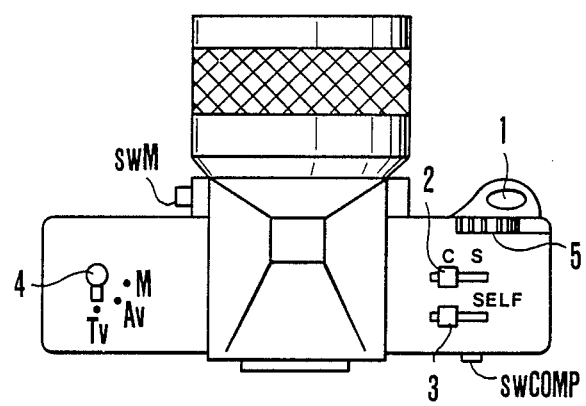
FIG. 7 is a top view of the same.
Figure 8:
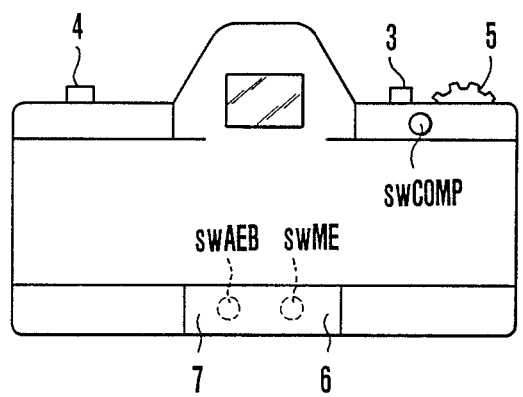
FIG. 8 is a back view of the same.

In FIG. 6, there is shown the arrangement of each operating member as viewed from the front side of the camera having incorporated therein the device employing the practical form of the feature shown in the embodiment of FIG. 1(a). In FIG. 7, there is shown the arrangement of each operating member as viewed from the top. In FIG. 8, there is shown the arrangement of each operating member as viewed from the back side. In FIGS. 6 to 8, reference numeral 1 denotes a release button. 2 denotes an operating lever for selecting either one of shooting modes, one of which is the continuous shooting (C) mode and the other of which is the single shooting (S) mode. 3 denotes an operating lever for selecting a self-timer. 4 denotes an exposure mode selection knob for selecting one of the exposure modes, namely, the shutter priority (Tv) mode, the aperture priority (Av) mode and the manual (M) mode. An electronic dial 5 is used when setting the shutter time, the aperture value or the exposure number-of-steps information at the time of the automatic exposure bracketing shooting (the information by, for example, 0.5 steps or 1 step) and has, for example, 2-bit electrically conductive patterns of 90° different phase from each other and a brush arranged thereon. swM denotes a switch for setting an aperture value. In the manual exposure mode, the aperture value can be altered by operating the dial 5 while pushing the switch swM. 6 denotes a switch cover of a chamber 7 containing switches of low frequency of use. swAEB denotes an automatic exposure bracketing switch contained in the chamber 7. swME denotes a multiple exposure switch contained in the chamber 7. swCOMP denotes an exposure compensation setting switch. When setting an exposure compensation value, the dial 5 is operated while pushing the switch swCOMP, to thereby set or alter the exposure compensation value.

Figure 2:
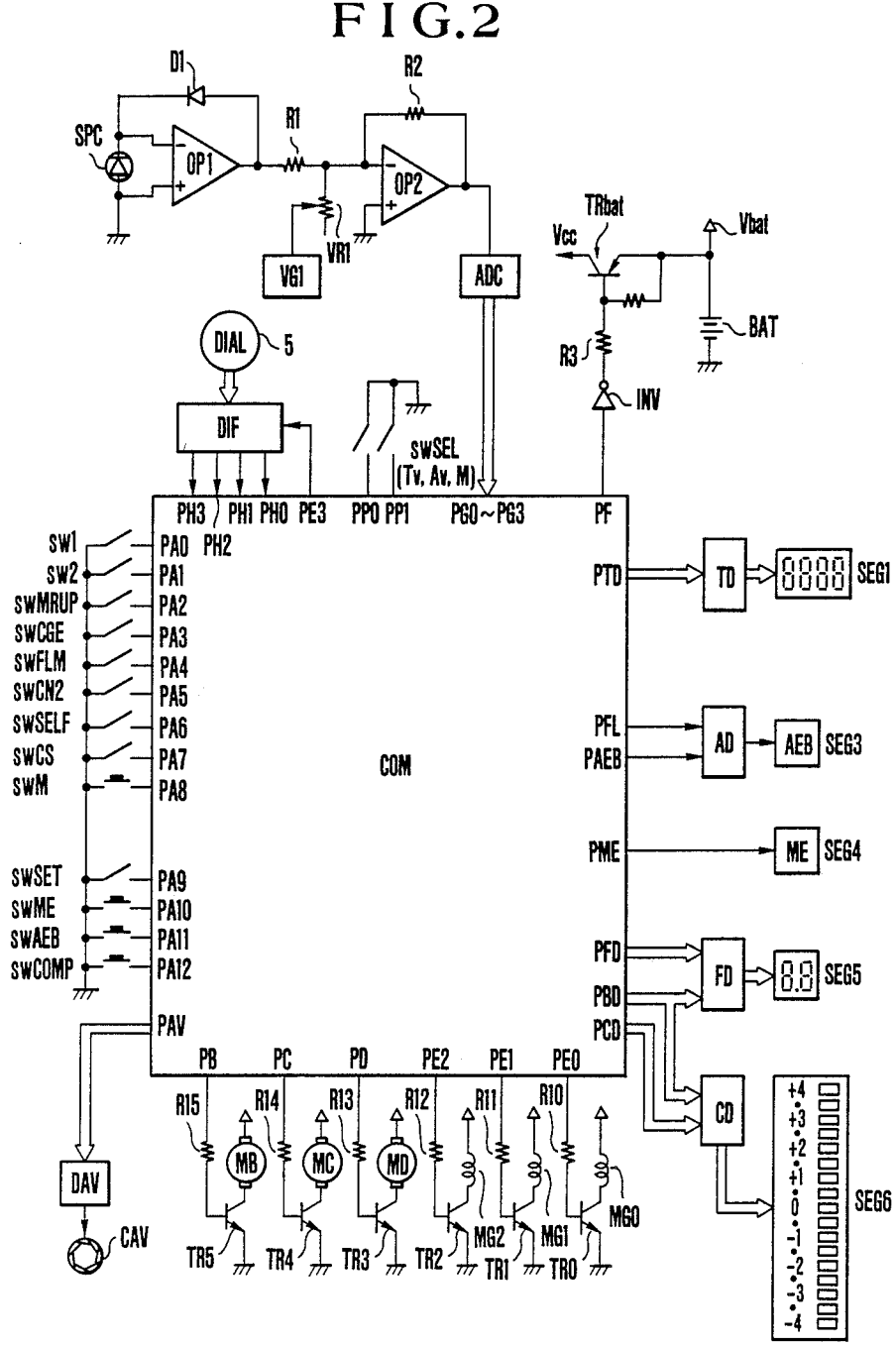
FIG. 2 is an electrical circuit diagram of a microcomputer and peripheral circuits arranged in the camera having incorporated therein what practices the embodiment shown in FIG. 1(a).

FIG. 2 is an electrical circuit diagram showing a practical form of the embodiment of FIG. 1(a).

In the figure, SPC denotes a photosensitive element. The photosensitive element SPC receives the reflected light from an object to be photographed, and outputs a light receiving signal to an operational amplifier OP1 of high input impedance with which a compression diode D1 is connected in the feedback circuit. The operational amplifier OP1 outputs logarithmically compressed object brightness information Bv through a resistor R1. A variable resistor VR1 connected to a constant voltage source VG1 outputs film sensitivity information Sv. An operational amplifier OP2 having a resistor R2 connected in the feedback circuit computes light measurement information "Ev=(Bv+Sv)" and outputs it. The light measurement information Ev is converted into a 4-bit digital value by an A/D converter ADC and supplied to input ports PG0 to PG3 of a microcomputer COM.

When the dial 5 is manipulated, a number corresponding to the number of its clicks is counted by a dial interface circuit DIF. The counted value is converted into 4-bit information, which is supplied to input ports PH0 to PH3 of the microcomputer COM. The information in the dial interface circuit DIF is reset by applying thereto a pulse signal from an output port PE3 of the microcomputer COM. Depending on what mode is selected by the exposure selection knob 4, an exposure mode switch swSEL having double switch components is turned on or off, producing 2-bit information representing the selected exposure mode, which is supplied to input ports PP0 and PP1 of the microcomputer COM.

When a battery BAT is loaded into the camera, an electrical power source Vbat is supplied to the microcomputer COM, decoders TD, AD, FD, CD of the display system, the dial interface circuit DIF, etc.. Also, when the first stroke switch sw1 connected to an input port PA0 is turned on by the first stroke of the release button 1, the potential level of the output port PF becomes high and a transistor TRbat is turned on by an inverter INV and a resistor R3, so that the voltage from the electric power source Vbat is supplied as an electric power source Vcc to circuits which consume relatively a lot of electric power such as the operational amplifiers OP1, OP2, etc. for light measurement.

Input ports PA1 to PA12 of the microcomputer COM are connected respectively to a second stroke switch sw2 which is turned on by the second stroke of the release button 1, a mirror-up switch swMRUP which is turned off when the mirror moves upward or turned on when the mirror moves downward, a charge completion detecting switch swCGE which is turned on when the mechanical charging is completed, a film switch swFLM which is turned on each time one-frame transportation is completed, a trailing curtain switch swCN2 which is turned on when the running of the trailing curtain is completed, a self-timer switch swSELF which is turned on when a self-timer is set by the operating lever 3, a switch swCS which is turned on when the continuous shooting mode is selected or turned off when the single shooting mode is selected, the aforesaid switch swM for setting an aperture value, a switch swSET which is turned off when the aforesaid switch cover 6 is closed or turned on when it is opened, the aforesaid multiple exposure switch swME, the aforesaid automatic exposure bracketing switch swAEB, and the aforesaid exposure compensation setting switch swCOMP.

Output ports PE0 to PE2 are connected through resistors R10 to R12 to the bases of transistors TR0 to TR2, respectively. The transistors TR0 to TR2 control energization of a first latch magnet MG0, a leading curtain magnet MG2 for running the leading curtain and a trailing curtain magnet MG2 for running the trailing curtain, respectively. Also, output ports PD, PC and PB are connected through resistors R13 to R15 to the bases of transistors TR3 to TR5, respectively. The transistor TR3 controls driving of a motor MD for charging. The transistor TR4 controls driving of a motor MC for rewinding. The transistor TR5 controls driving of a motor MB for winding which performs winding of the film at a high speed.

From an output port PTD, the content of a register RGTv for shutter time information in the microcomputer COM is output to the decoder TD. The decoder TD converts that content into a signal for a shutter time display and outputs that signal to an indicator SEG1 constructed with a liquid crystal, etc. to be connected thereto.

From each of output ports PFL and PAEB, a signal of "1" (means high level) or "0" (means low level) is output to the decoder AD. The decoder AD, when the signal of "1" is inputted from the output port PFL, outputs a signal for a blinking display of an automatic exposure bracketing mark to an indicator SEG3 constructed with a liquid crystal, etc. to be connected thereto. When the signal of "1" is inputted from the output port PAEB, a signal for a display of the automatic exposure bracketing mark is output to the indicator SEG3.

From an output port PME, a signal of "1" or "0" is output to an indicator SEG4 constructed with a liquid crystal, etc. . The indicator SEG4, when the signal of "1" is inputted, displays a multiple exposure mark.

From an output port PFD, the content of a register RGAv for aperture value information, or the content of a register RGME for the number of times of multiple exposure, in the microcomputer COM is output to the decoder FD. From an output port PBD, the content of a register RGAEBD for a display of the automatic exposure bracketing number-of-steps is output to the decoder FD and the decoder CD. Also, from an output port PCD, the content of a register RGCOMPD for a display of the exposure compensation value in the microcomputer COM is output to the decoder CD. The aforesaid decoder FD outputs a signal for a display of the numerical value corresponding to each of the aforesaid contents to an indicator SEG5 constructed with a liquid crystal, etc. to be connected thereto, while the aforesaid decoder CD outputs a display signal corresponding to each of the aforesaid contents to an indicator SEG6 constructed with a liquid crystal, etc. to be connected thereto and having displays arrayed like a bar graph.

From an output port PAV, the content of the register RGAv for aperture value information in the microcomputer COM is output to a drive circuit DAV for aperture control. The drive circuit DAV for aperture control outputs the information converted into the actual aperture information to a driving actuator CAV, for example, a stepping motor, etc. connected thereto, and drives this to perform the proper aperture control.

Next, the operation of the microcomputer COM of the FIG. 2 embodiment is described referring to the flowcharts of FIGS. 3(a), 3(b), 4(a), 4(b) and 5.

Figure 3A:
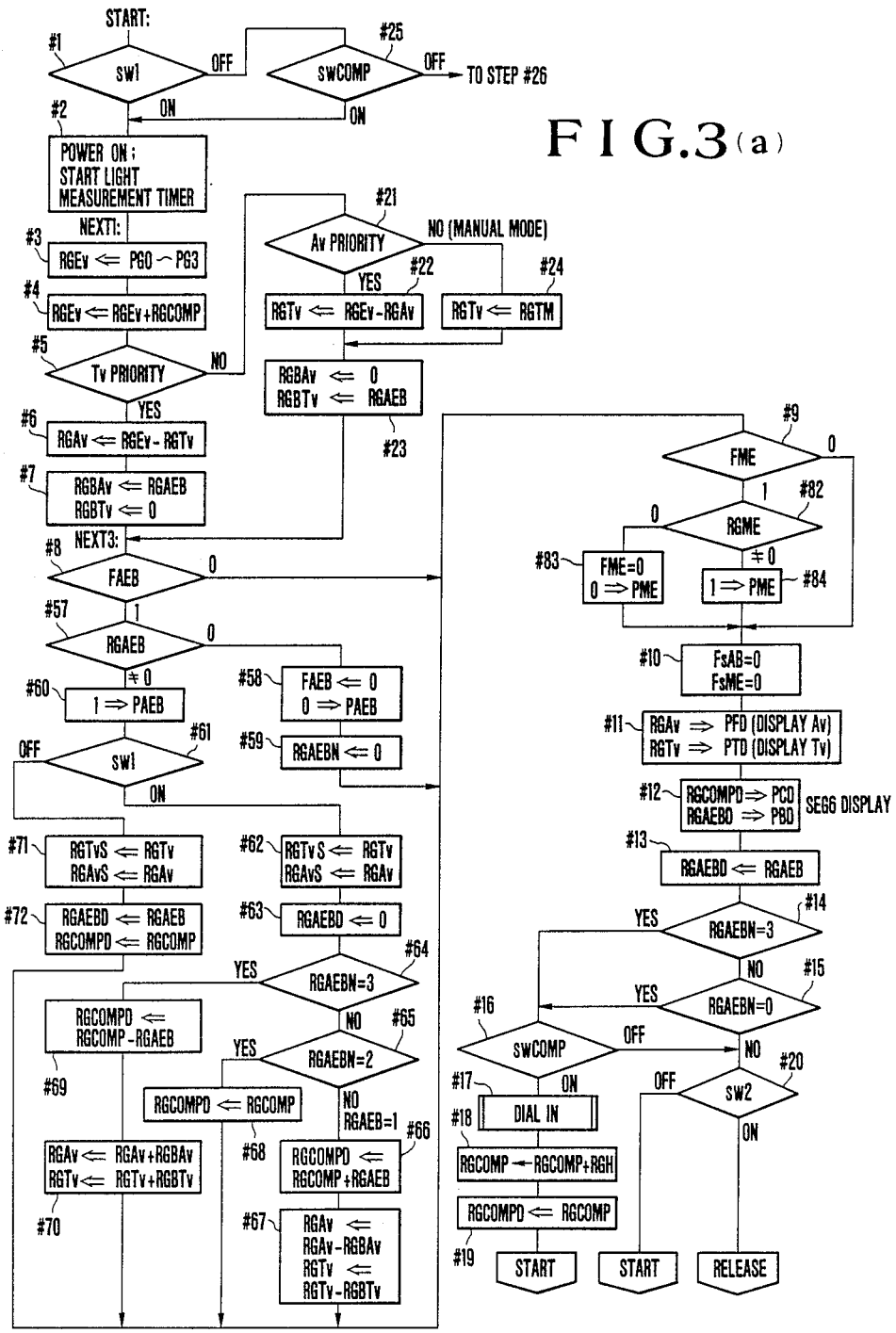
FIGS. 3(a), 3(b), 4(a), 4(b) and 5 are its flowcharts.
Figure 3B:
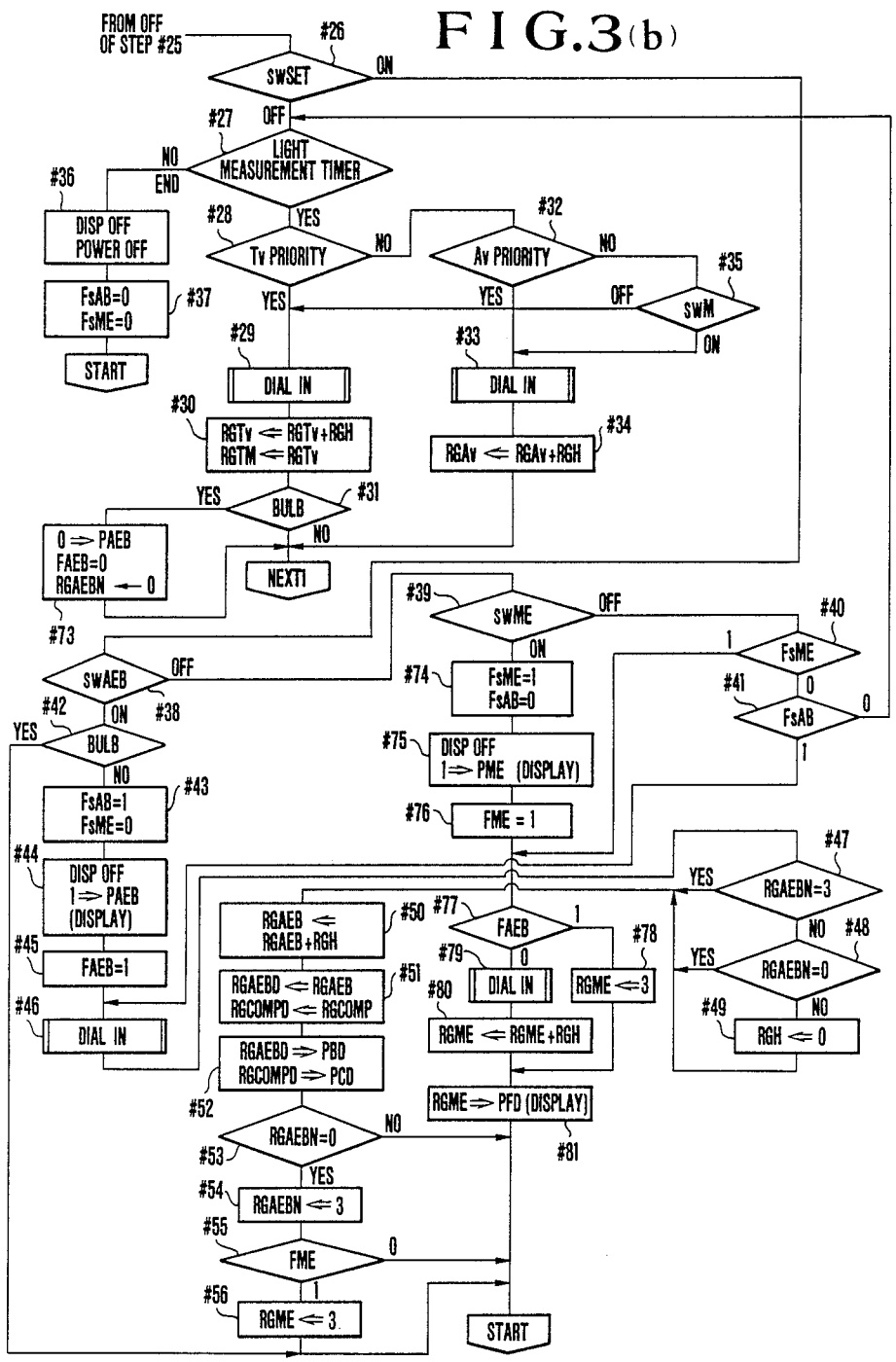
Figure 4:
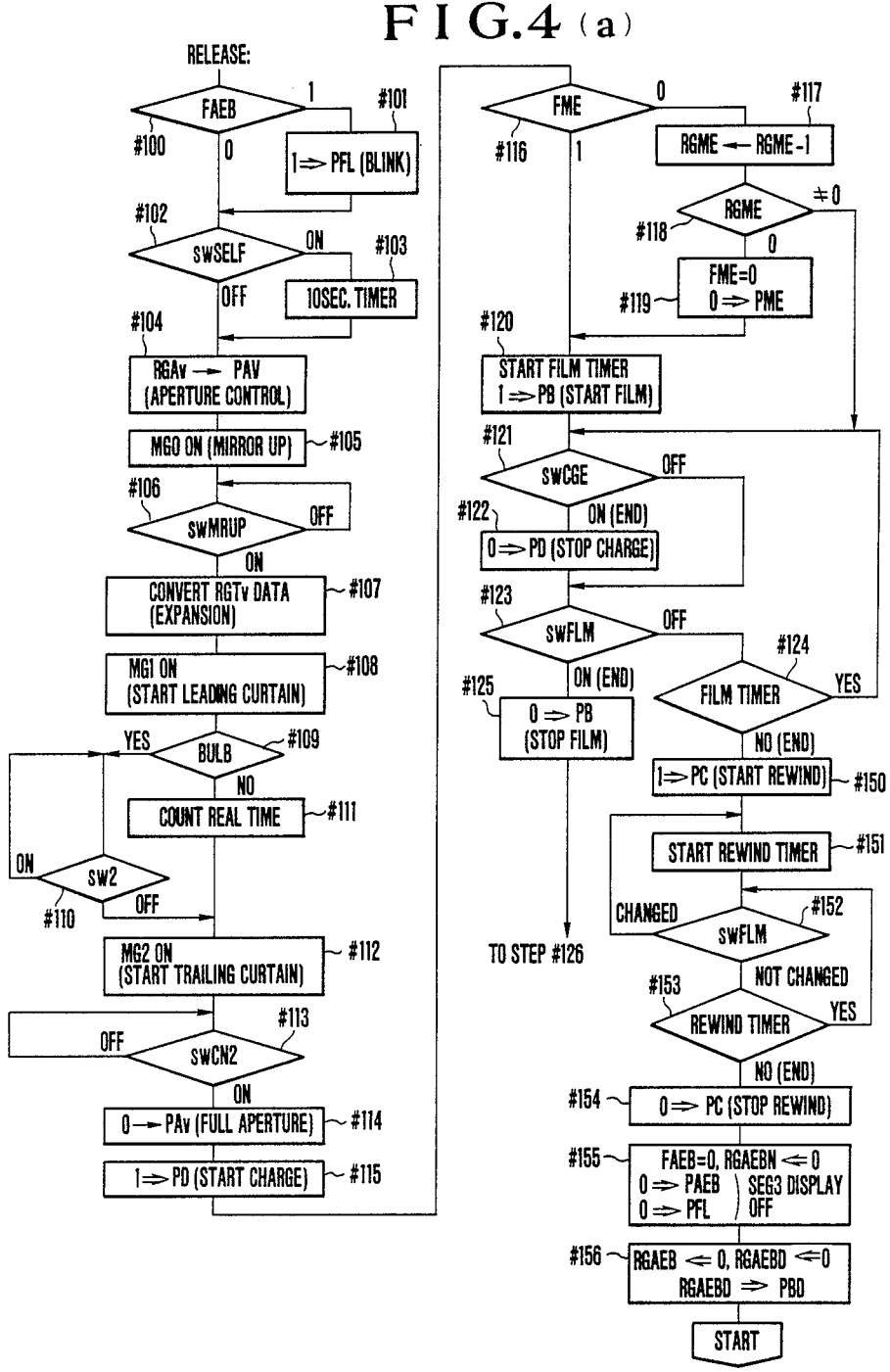
Figure 4B:
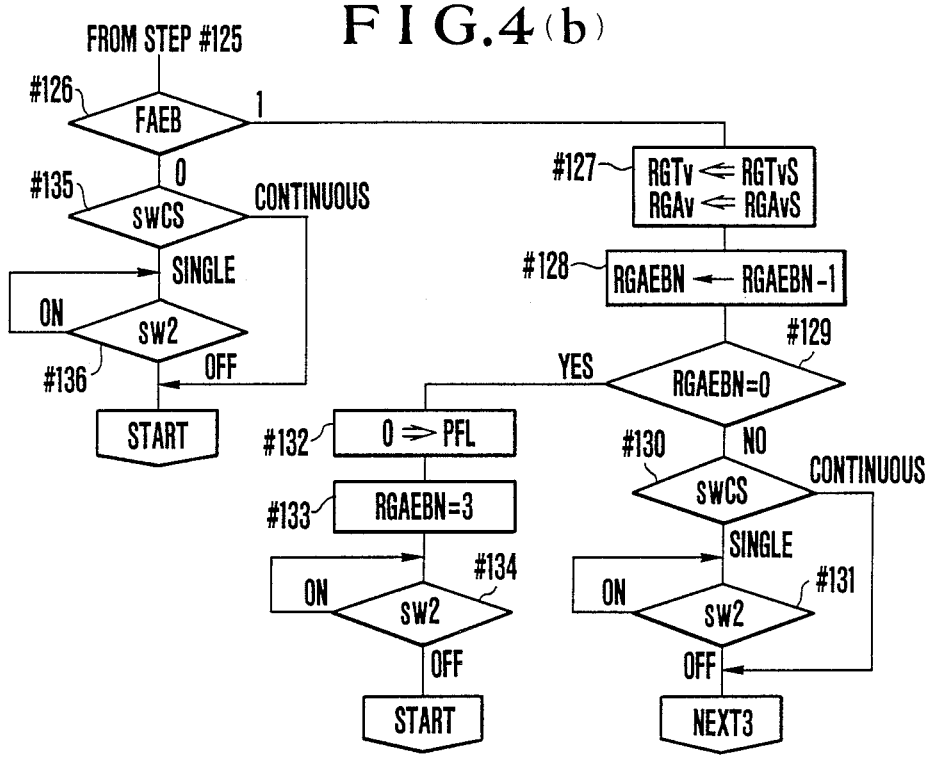
Figure 5:
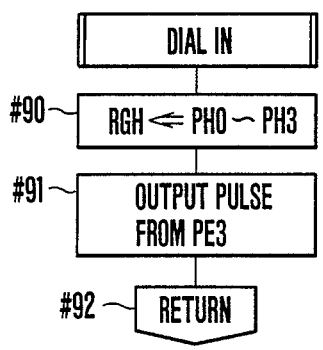

With the battery BAT loaded in the camera, the electric power source Vbat is generated, rendering the microcomputer COM to begin operating from "START" of the flow shown in FIG. 3(a).

Step #1: Suppose only the first-stroke pushing of the release button 1 is effected by the photographer, then when the "on" signal of the first stroke switch sw1 is supplied to the input port PA0, the program advances to a step #2.

Step #2: The signal of "1" is output from the output port PF to turn on the transistor TRbat, and the electric power source Vcc is supplied to each part. Then, the light measurement timer is started. This light measurement timer is to maintain the supply of the electric power source Vcc for a predetermined time from the input of an "off" signal of the first stroke switch sw1. With the help of this, even if the photographer removes his finger from depressing the release button 1, the light measuring state can be preserved for the predetermined time so that it becomes possible to carry out altering of the preset information by the exposure mode selection knob 4 while looking at the display. Incidentally, this feature can easily be realized by a hardware timer incorporated in the microcomputer COM.

Step #3: The light measurement information Ev converted into the 4-bit digital value by the A/D converter ADC is memorized in the internal register RGEv.

Step #4: The exposure compensation information of digital value stored in the register RGCOMPD is added to the light measurement information Ev memorized in the register RGEv to form a new item of light measurement information Ev with inclusion of the exposure compensation information, which is then memorized in the register RGEv. Incidentally, regarding the input of the exposure compensation information, a detailed description thereof is given in connection with steps #16 to #18.

Step #5: Whether or not the shutter priority mode is set is discriminated from the input states of the input ports PP0 and PP1. Now assuming that the shutter priority mode is set, then the program advances to a step #6.

Step #6: The content of the register RGTv for shutter information which is memorizing the preset information by operating the dial 5 is subtracted from the content of the register RGEv, and the result (aperture information Av) is memorized in the register RGAv for aperture information. Incidentally, the contents of all the registers in the microcomputer COM are sustained so long as the battery BAT is loaded. Again, at the first time when the battery BAT is loaded, a value of high frequency of use, for example, 1/125 sec., is initially set.

Step #7: The content of the register RGAEB which is memorizing the automatic exposure bracketing number-of-steps information is transferred to and stored in the register RGBAv for the automatic exposure bracketing number-of-steps of the aperture. Also, the content of the register RGBTv for the automatic exposure bracketing number-of-steps of the shutter is made to be zero (0).

Step #8: The state of a flag FAEB representing whether or not the automatic exposure bracketing mode is set is discriminated. Now assuming that the automatic exposure bracketing mode is not set, then the program advances to a step #9.

Step #9: The state of a flag FME representing whether or not the multiple exposure mode is set is discriminated. Now assuming that the multiple exposure mode is not set, then the program advances to a step #10.

Step #10: A flag FsAB representing whether or not the automatic exposure bracketing switch swAEB has been actuated is reset to "0". Also, a flag FsME representing whether or not the multiple exposure switch swME has been actuated is reset to "0".

Step #11: The content of the register RGAV for aperture information is output from the output port PFD and the content of the register RGTv for shutter information is output from the output port PTD. By this, the aperture value obtained by the computation is displayed on the indicator SEG5 and the preset shutter time is displayed on the indicator SEG1.

Step #12: The content of the register RGCOMPD for display of the exposure compensation value is output from the output port PCD, and the content of the register RGAEBD for display of the automatic exposure bracketing number-of-steps is output from the output port PBD. Incidentally, it is assumed that just after the battery BAT is loaded, the microcomputer COM initially sets all of the registers RGAEB, RGCOMPD, RGAEBD, RGCOMP (for exposure compensation value) and RGAEBN (for the number of times of the automatic exposure bracketing shooting) to "0", so that there are no settings of the automatic exposure bracketing and the exposure compensation.

The decoder CD receives of the outputs of the output ports PCD and PBD, and outputs information corresponding to the exposure compensation value and the value of the automatic exposure bracketing number-of-steps to the indicator SEG6, and causes the indicator SEG6 to display that information. Now, the operation of that decoder CD will be described.

Figure 9:
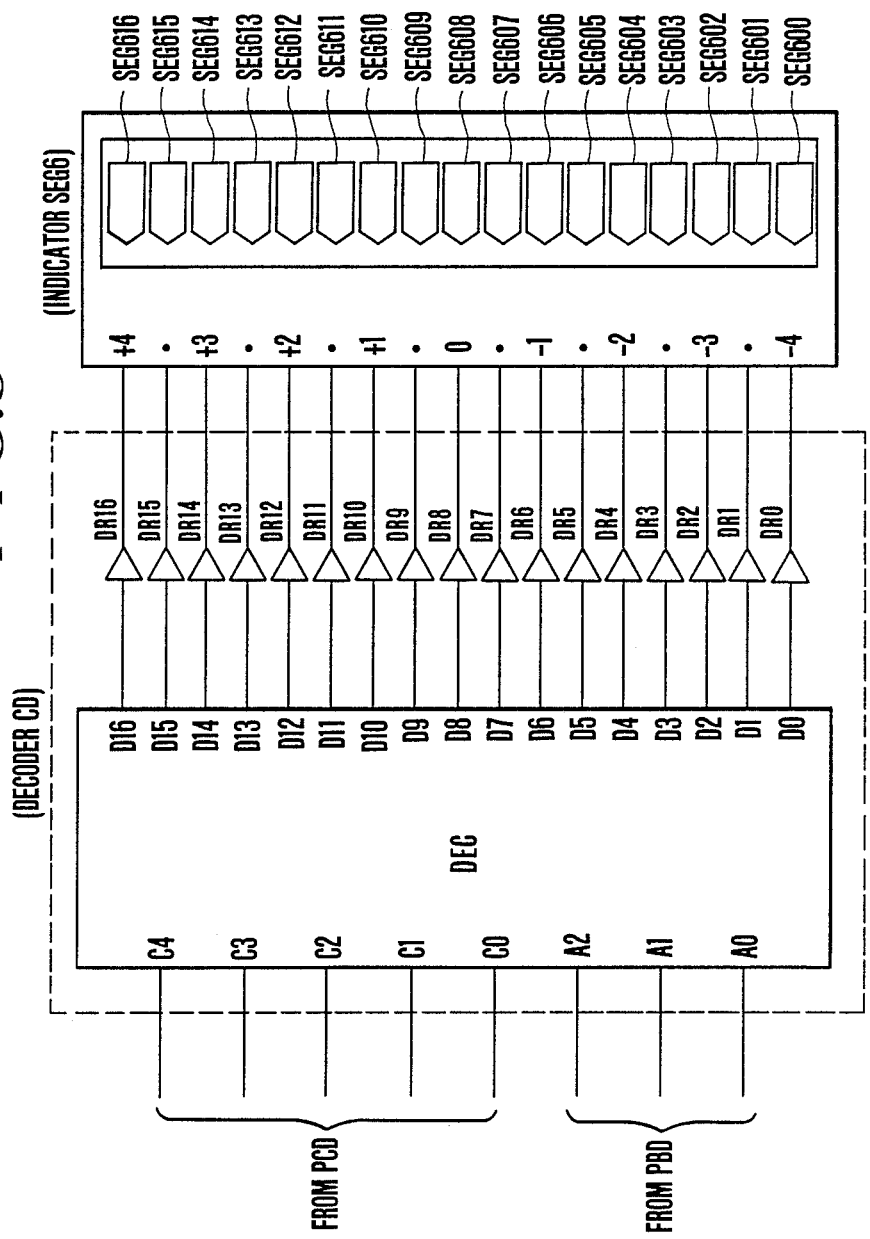
FIG. 9 is an electrical circuit diagram illustrating the structure of construction of a decoder CD and an indicator SEG6 shown in FIG. 2.

FIG. 9 shows the fundamental structure of construction of the decoder CD and the indicator SEG6 with a block enclosed by broken lines in the figure being the decoder CD comprising a data converting part DEC and segment drivers DR0 to DR16. The data converting part DEC is provided with data input terminals for receiving the data from the output ports PCD and PBD of the microcomputer COM. Here, taking an example, the data representing the exposure compensation number-of-steps and the data representing the automatic exposure bracketing number-of-steps are expressed in binary form as shown in FIG. 10(a) and FIG. 10(b), respectively. As the data input terminals for receiving the exposure compensation information output from the output port PCD, five terminals C0 to C4, and as the data input terminals for receiving the automatic exposure bracketing number-of-steps information output from the output port PBD, three terminals A0 to A2, totaling eight terminals, are used. The pieces of information supplied to the respective data input terminals C0 to C4 and A0 to A2 are converted into data for display by the data converting part DEC, and are output through data output terminals D0 to D16 to drivers DR0 to DR16 for display segments, respectively. Then, the drivers DR0 to DR16 drive segments SEG600 to SEG616 in the indicator SEG6 independently of each other so that a display is presented. Here, of the data output terminals D0 to D16, the one which produces "1" causes the corresponding segment, for example, if the data output terminal D0 is "1", the segment SEG600, or if the data output terminal D8 is "1", the segment SEG608, to light. The data converting part DEC can be constructed with AND gates and OR gates, for example, those shown in FIG. 11. As an example of data conversion, in the case of "C4=C3=C2=C1=C0=0 and A2=A1=A0=0", the data output terminal D8 only produces an output of "1", while the terminals D0 to D7 and D9 to D16 each produce an output of "0". In another case of "C4=C3=C2=1 and C1=C0=0" (the exposure compensation number-of-steps is −2.0) and A2=1 and A1=A0=0 (the automatic exposure bracketing number-of-steps is 2.0), the three outputs at the terminals D0, D4 and D8 become "1", while the other outputs become "0".

Returning to the description of the aforesaid step #12, because it is assumed here that neither the setting of the automatic exposure bracketing mode, nor the setting of the exposure compensation mode, is done, "RGAEBD=000" and "RGCOMPD=00000" result. Since these values are output from the output ports PBD and PCD respectively, the data input terminals A2 to A0 and C4 to C0 of the data converting part DEC all are "0". Therefore, the data converting part DEC causes only the output of the data output terminal D8 to become "1". Responsive to this, the driver DR8 drives the segment SEG608 to light, while the other segments remain turned off. Thus, such a display as shown in FIG. 12(a) appears in the indicator SEG6. This display signifies that if the shooting is done as it stands, the exposure will be made without application of the exposure compensation.

Step #13: The content of the register RGAEB for the automatic exposure bracketing number-of-steps is put into the register RGAEBD for display of the automatic exposure bracketing number-of-steps. This step has its meaning when the automatic exposure bracketing shooting is carried out. In a case where the automatic exposure bracketing mode is not set, because the content of each register, too, is "000", particularly this step loses its meaning.

Step #14: Whether or not the content of the register RGAEBN for the number of times of the automatic exposure bracketing shooting is "3" is discriminated. Because it is here that the automatic exposure bracketing mode is not set, for "RGAEBN=0", the program advances to a step #15.

Step #15: Whether or not the content of the aforesaid register RGAEBN is "0" is discriminated. Because it is here that as has been described above, "RGAEBN=0", the program advances to a step #16. Incidentally, if the content of the aforesaid register RGAEBN is "2" or "1" in the middle of the course of the automatic exposure bracketing shooting, then without passing through a process for altering the exposure compensation comprising steps #16 to #19, the program advances to a step #20. This is because if the exposure compensation is altered in the middle of the automatic exposure bracketing shooting, there is a high possibility of the photographer being put into confusion, (as will more fully be described later).

Step #16: Whether or not the switch swCOMP for setting exposure compensation is turned on is discriminated by reading the level of the input port PA12. If it is turned on, the program advances to a step #17. If off, the program advances to the step #20.

Next explanation is given to a case where as the aforesaid switch swCOMP for exposure compensation setting is in "on" state, the program has advanced to a step #17.

Step #17: It is here that as the dial 5 is actuated, an information read routine is executed. The read routine in accompaniment with actuation of the dial 5 is explained below by using FIG. 5.

Information Read Routine

Step #90: The information which is supplied to the input ports PH0 to PH3 is memorized in a register RGH for dial. At this time, what are stored in that register RHG are a numerical value corresponding to the number of clicks of the dial 5 and information representing whether this numerical value is positive or negative depending on the direction of rotation of the dial 5. In other words, how many steps should be shifted upward or downward from the current information is stored in the form of 4-bit information.

Step #91: A pulse signal is produced at the output port PE3. By this, the numerical value of the dial interface circuit DIF is reset to "0".

Step #92: The program returns to the initial step.

Returning again to the flowchart of FIG. 3(a).

Step #18: The set value by the dial actuation (the content of the register RGH for dial) is added to the register RGCOMP for exposure compensation value and the result is again stored in that register RGCOMP, being made to be a new exposure compensation value. Incidentally, in the present embodiment, as shown in FIGS. 10(a) and 10(b), the register RGCOMP is 5 bits in data length, while the register RGH is 4 bits in data length. But when performing addition, the method such as that of adding "0" to the upper place of the 4 bits of the register RGH to make 5-bit data should be employed. The same is applied to the computations between the other registers of different bit lengths.

Step #19: The content of the register RGCOMP for exposure compensation value is transferred to and stored in the register RGCOMPD for exposure compensation value display. Then, the program returns to "START".

Suppose the data stored in the register RGH in the aforesaid step #17 is "0001", then the step #18 has "RGCOMP=00001" and the step #19 gets "RGCOMPD=00001". Thus, an exposure compensation value of +0.5 has been set (see FIG. 10(a)). The program that has so far returned to "START" goes again on the way of each of the above-described steps, and similar operations are carried out. At the step #12, the content of the register RGCOMPD for exposure compensation value display is output to the output port PCD. Responsive to this, the data converting part DEC in the decoder CD changes its data output terminal D9 only to "1", causing the driver DR9 to light the segment SEG609. Therefore, the indicator SEG6 presents a display shown in FIG. 12(b). That is, that the exposure compensation has been set to +0.5 steps is displayed.

In a case where the switch swCOMP for exposure compensation setting is determined in the step #16 to be turned off, the program advances to the step #20 as has been described above.

Step #20: Whether or not the release button 1 is pushed to the second stroke and an "on" signal of the second stroke switch sw2 is supplied to the input port PA1 is discriminated. Now, if the "on" signal of the second stroke switch sw2 is not inputted, the program then returns to "START". This routine also makes it possible that so long as the "on" signal of the first stroke switch sw1 is inputted, computation information is obtained from the object brightness information, the film sensitivity information and the setting information, and these pieces of information are left displayed.

Alternatively assuming that the aperture priority mode is set, then the program advances through step #5 → step #21 → step #22.

Step #22: The content of the register RGAv for aperture information which has been memorizing the information set by operating the dial 5 and the switch swM for aperture value setting is subtracted from the content of the register RGEv, and the register RGTv for shutter information is caused to memorize that result. Incidentally, it is assumed that just after the battery BAT has been loaded, a value of high frequency of use, for example, F5.6, is initially set.

Step #23: The content of the register RGAEB for the automatic exposure bracketing number-of-steps which is memorizing the automatic exposure bracketing number-of-steps information is transferred to and stored in the register RGBTv for the automatic exposure bracketing number-of-steps of the shutter. The content of the register RGBAv for the automatic exposure bracketing number-of-steps of the aperture is made to be zero.

Subsequently, even in the case of the aperture priority mode, the program advances a similar sequence to that in the shutter priority mode. The aperture value set in the step #11 is displayed on the indicator SEG5, while the shutter time obtained by the computation is displayed on the indicator SEG1.

Alternatively suppose the manual exposure mode is in use, the program then advances through the step #5 → the step #21 → a step #24.

Step #24: The content of the register RGTM which is memorizing the shutter time information set by operating the dial 5 is transferred to and stored in the register RGTv for shutter information. This is because, if the manual exposure mode and the automatic exposure bracketing mode are simultaneously operated, the content of the register RGTv varies in each shooting. Therefore, it is necessary to leave the information set by operating the dial 5 to be memorized as it stands, as will more fully be described later.

A subsequent process advances a similar sequence to that in the aperture priority mode, so that the aperture value set by the step #11 is displayed on the indicator SEG5 and the set shutter time is displayed on the indicator SEG1.

Next, a case where information is set by a dial actuation at a time during the light measurement timer operation is described. When the pushing of the release button 1 (to the first stroke) is stopped in the middle of the aforesaid sequence, an "off" signal of the first stroke switch sw1 is inputted and the program advances from the step #1 to a step #25.

Step #25: Whether or not the switch swCOMP for exposure compensation setting is in "on" state is discriminated by reading the level of the input port PA12. If this result shows the "on" state, the program advances to the step #2 and to the above-described light measurement, computation, display routines. That is, according to the present embodiment, this camera, even when the exposure compensation setting member is operated, performs the display of the shutter time and aperture value based on the measured light value. If the switch sWCOMP for exposure compensation setting, on the other hand, remains off, the program advances to a step #26 (FIG. 3(b)), entering an information setting routine by actuating the dial at a time during the light measuring timer operation.

Step #26: Whether or not an opening operation of the switch cover 6 has been carried out is discriminated on the basis of the state of the switch swSET. If, as the switch cover 6 remains closed, the "off" signal of the switch swSET is supplied to the input port PA9, the program advances to a step #27.

Step #27: Whether or not the light measurement timer is in operation is discriminated. Here, because it is just after the start of the operation of the light measurement timer at the step #2, the program advances to a step #28.

Step #28: Whether or not the shutter priority mode is set in is discriminated on the basis of the input states of the input ports PP0 and PP1. Now, if the shutter priority mode is in use, the program advances to a step #29.

Step #29: Here, the information read routine in accompaniment with the operation of the dial 5 is executed.

Step #30: The numerical value set by the dial operation (the content of the register RGH) and the shutter time information (the content of the register RGTv) are added together, and the register RGTv for shutter time information is caused to memorize that sum again. Also, the content of the register RGTv for shutter time information is transferred to and stored in the register RGTM.

Step #31: Whether or not a certain code representing the bulb mode positioned adjacent to the longest value of the shutter time is stored in the aforesaid register RGTM is discriminated. Now, if the bulb mode is not in use, the program jumps to "NEXT1", i.e., the step #3.

In such a manner, during that part of the light measurement timer operation which occurs after the depression of the release button 1 (to the first stroke) has been stopped, the set information can be altered by operating the dial 5. After that, by executing the routine beginning with the step #3, the aperture value and the shutter time can be displayed on the indicators SEG1 and SEG5 respectively in the step #11.

Alternatively suppose the aperture priority mode is in use, the program advances through the step #28 → the step #32 → a step #33.

Step #33: Here, similarly to the step #29, the information read routine in accompaniment with the operation of the dial 5 is executed.

Step #34: The numerical value set by the dial operation (the content of the register RGH) and the aperture value information (the content of the register RGAv) are added together, and the register RGAv for aperture information is caused to memorize that sum again. In the aperture priority mode, too, the program then jumps to the "NEXT1", i.e., the step #3. Similarly to the shutter time priority mode, in the step #11, the aperture value and the shutter time can be displayed on the indicators SEG1 and SEG5 respectively.

Alternatively suppose the manual exposure mode is in use, then the program advances through the step #28 → the step #32 → a step #35.

Step #35: Whether the switch swM for aperture value setting is turned on or off is discriminated. Since the arrangement is made so that in the manual exposure mode, the aperture value can be altered by the simultaneous occurrence of the operation of the switch swM for aperture value setting and the operation of the dial 5, while the shutter time can be altered by operating only the dial 5, the critical point lies here that when the aforesaid switch swM is turned on, the program advances to execute a similar routine to that in the aperture priority mode (the step #33), while when off, the program advances to execute a similar routine to that in the shutter priority mode (the step #29).

When a predetermined time from the stoppage of the pushing operation of the release button 1 has expired, the light measurement timer operation terminates. In accompaniment with this, the program advances from the step #27 to a step #36.

Step #36: The outputs at the output ports PTD, PFL, PAEB, PME, PFD, PBD and PCD are made to be "0" to turn off all the displays of the indicators SEG1 to SEG6 (where the indicator SEG2 does not exist). Also, the output at the output port PF is made to be "0" to turn off the transistor TRbat. Thus, the supply of the electric power source Vcc is stopped.

Step #37: Similarly to the step #10, the flag FsAB representing whether or not the automatic exposure bracketing switch swAEB has been actuated and the flag FsME representing whether or not the multiple exposure switch swME has been actuated are both reset to "0".

Then, the program jumps to the "START". Hence, after the light measurement timer has terminated, the procedure: Step #1 → Step #25 → Step #26 → Step #27 → Step #36 → Step #37, i.e., the standby mode, repeats itself.

Next, a case where the automatic exposure bracketing mode is set is described. Before this, what results from the performance of only the opening operation of the switch cover 6 for the purpose of setting the automatic exposure bracketing mode, is described. When the switch cover 6 is opened, its operative connection turns on the switch swSET. This "on" signal is supplied to the input port PA9. Accordingly, the program advances from the step #26 to a step #38.

Step #38: Discrimination of the automatic exposure bracketing switch swAEB is performed. Because it is soon after the switch cover 6 has been opened, the automatic exposure bracketing switch swAEB is not yet actuated, so that the program advances to a step #39.

Step #39: Discrimination of the multiple exposure switch swME is performed. Likewise, because the multiple exposure switch swME is not yet actuated, the program advances to a step #40.

Step #40: Discrimination of the flag FsME representing whether or not a pushing operation of the multiple exposure switch swME has been carried out is performed. Because in the initial state just after the battery BAT is loaded and in the "on" state of the first stroke switch sw1, the flag FsME is reset to "0" by the step #10, the program advances to a step #41.

Step #41: Discrimination of the flag FsAB representing whether or not the pushing operation of the automatic exposure bracketing switch swAEB has been carried out is performed. Similarly to the case of the step #40, because here the flag FsAB is reset to "0" by the step #10, the program jumps to the step #27.

Thus, the opening of the switch cover 6 followed only by the input of the "on" signal of the switch swSET causes no execution.

Next, a case where the aforesaid state is followed by one cycle of pushing operation of the automatic exposure bracketing switch swAEB is described. Upon operating of the automatic exposure bracketing switch swAEB, this is accompanied by the "on" signal supplied to the input port PA11. Then, the program advances from the step #38 to a step #42.

Step #42: Whether or not the content of the register RGTM represents the bulb mode is discriminated. If it represents the bulb mode, the program returns to the "START". Thus, the automatic exposure bracketing mode never comes to operate. If it does not report the bulb mode, the program advances to a step #43.

Step #43: The flag FsAB representing that the automatic exposure bracketing switch swAEB is turned on is set to "1" and the flag FsME representing that the multiple exposure switch swME is turned on is reset to "0".

Step #44: The outputs at the output ports PTD, PFL, PAEB, PME, PFD, PBD and PCD are made to be "0" to turn off all the displays of the indicators SEG1 to SEG6. Then, the output at the output port PAEB only is made to be "1", causing the automatic exposure bracketing mark of the indicator SEG3 to light.

Step #45: The flag FAEB representing that the automatic exposure bracketing mode has been set in is set to "1".

Step #46: Similarly to the step #29 or the step #33, the information read routine in accompaniment with the operation of the dial 5 is executed. In this case, suppose the automatic exposure bracketing number-of-steps information set in a step #80 by the dial 5 is, for example, "0.5", then the numbers of steps: −0.5, 0, +0.5, or suppose it is "1", then the numbers of steps: −1, 0, +1, are used in automatically varying the exposure, when the automatic exposure bracketing shooting is carried out the previously set number of times, in this instance, three times. Incidentally, the term "the shootings by the numbers of steps: −0.5, 0, +0.5" used above means that a series of continuous shootings are carried out by successive three exposure values, or an exposure value which is under the standard exposure value obtained by the computation by 0.5 steps, the standard exposure value, and another exposure value which is over the standard exposure value by 0.5 steps.

Step #47: Whether or not the content of the register RGAEBN for the number of times of automatic exposure bracketing shooting is "3" is discriminated. If RGAEBN =3, the program advances to a step #50. If REAEBN ≠3, the program advances to a step #48.

Step #48: Whether or not the content of the aforesaid register RGAEBN is "0" is discriminated. If RGAEBN =0, the program advances to the step #50. If RGAEBN ≠0, the program advances to a step #49.

Step #49: An occasion of passing through this step arises when the above-described steps #47 and #48 determine that the content of the register RGAEBN is "2" or "1". (The content of the register RGAEBN takes a value only in a range of "0" to "3".)

An event that the value stored in the aforesaid register RGAEBN is "RGAEBN=3" signifies that the automatic exposure bracketing is set in, and of the frames of film as predetermined to be used in the automatic exposure bracketing shooting, any one is not shot. Another event of "RGAEBN=2" signifies that of the predetermined three frames, the first one has already been shot, leaving more two frames yet to be shot. Yet another event of "RGAEBN=1" signifies that of the predetermined three frames, the first two frames have already been shot, leaving the last one unexposed. The event of "RGAEBN=0" either occurs just after the automatic exposure bracketing shooting of all the predetermined three frames of film has been completed, or signifies that there is no setting of the automatic exposure bracketing shooting. The fact that the content of the register RGAEBN is "2" or "1" signifies that only one or two of the three frames of film for the automatic exposure bracketing shooting have been exposed, that is, the automatic exposure bracketing shooting is on the way. To newly accept from this stage a dial operation for alteration of the automatic exposure bracketing number-of-steps many confuse the photographer. Therefore, this must be prohibited. On this account, in this step, the content of the register RGH for dial in which the dial input value has been stored is cleared to "0". By this, the content of the register RGAEB for the automatic exposure bracketing number-of-steps is prohibited from being renewed.

Step #50: The content of the register RGAEB for the automatic exposure bracketing number-of-steps and the content of the register RGH for dial are added together, and the register RGAEB is caused to memorize that sum again. As has been described above, it is assumed that the unit of the minimum resolving power by every one click of the dial 5 can freely be set to 0.5 steps, or 1 step. It is to be noted that if it is different from the resolving power of the shutter time and the aperture value, a program that multiplies the content of the register RGAEB by an integer may be inserted. Since this has no relation to the invention, a detailed explanation is omitted here.

Step #51: The content of the register RGAEB for the automatic exposure bracketing number-of-steps is transferred to and stored in the register RGAEBD for display of the automatic exposure bracketing number-of-steps. Also, the content of the register RGCOMP for the exposure compensation value is transferred to and stored in the register RGCOMPD for display of the exposure compensation value.

Step #52: The content of the aforesaid register RGAEBD is output from the output port PBD, and the content of the aforesaid register RGCOMPD is output from the output port PCD. By this, a display of the automatic exposure bracketing mode setting is performed on the indicators SEG5 and SEG6.

That is, in the aforesaid indicator SEG5, a numerical value representing, for example, "0.5" in the number of steps is displayed. Incidentally, the decoder FD and the indicator SEG5 to be used at this time also serve to present the aperture display. Because the aperture value is decoded from the Av in the APEX value to the F-number and the automatic exposure bracketing number-of-steps is decoded to the numerical value in units of 0.5 steps, it is necessary to alter or change over the decoded content. But, the necessity of displaying the automatic exposure bracketing number-of-steps on the indicator SEG5 arises only when the flow from the step #38 has entered the automatic exposure bracketing number-of-steps setting mode. In this case, it may be considered that the shutter time and aperture value displays are turned off in the "DISP OFF" of the step #44, and a blank code is output from the output port PFD to the decoder FD. Therefore, if the decoder FD is so constructed that in a case where the data such as the aperture value display, etc. is output from the output port PFD, this is preferentially decoded to be displayed on the indicator SEG5, while when the output content from the output port PFD is the blank display, a display of the automatic exposure bracketing number-of-steps is performed based on the automatic exposure bracketing number-of-steps information output from the output port PBD, it becomes possible to perform a proper numerical value display.

Meanwhile, it is on the indicator SEG6 that the information of the automatic exposure bracketing number-of-steps output from the output port PBD and the information of the exposure compensation output from the output port PCD are displayed, as has been described above. Taking an example of display in a case where the automatic exposure bracketing mode is set in, if the exposure compensation value is "0", the data of "00000" to the data input terminals C4 to C0, and if the automatic exposure bracketing number-of-steps is "1.0", the data of "010" to the data input terminals A2 to A0, are output from the output ports PCD and PBD. Responsive to these, the data converting part DEC in the decoder CD changes its data output terminals D6, D8 and D10 to "1" and the others to "0". Therefore, the drivers DR6, DR8 and DR10 cause the respective segments SEG606, SEG608 and SEG610 in the indicator SEG6 to be lighted for display. This results in presenting a display state shown in FIG. 12(c). On looking at the display at a glance, the photographer can understand that the set automatic exposure bracketing shooting will take three shots with the correct exposure value computed from the measured light value by a −1 step underexposure compensation, by no compensation, and by a −1 overexposure compensation.

With the automatic exposure bracketing number-of-steps remaining the same at "1.0", if the exposure compensation is set to "+0.5", the data input terminals A2 to A0 are supplied with the same data or "010", and the data input terminals C4 to C0 with data of "00001", respectively through the output ports PBD and PCD. Responsive to these, the data converting part DEC in the decoder CD changes its data output terminals D7, D9 and D11 to "1" and the others to "0". Therefore, the drivers DR7, DR9 and DR11 cause the segments SEG607, SEG609 and SEG611 to be lighted for display. This results in presenting a display state shown in FIG. 12(d). So it is understandable at a glance that the set automatic exposure bracketing shooting will take three shots with 0.5 steps underexposure, +0.5 steps overexposure, and +1.5 steps overexposure in regard to the correct exposure computed from the measured light value.

After such a display has been carried out, the program advances to a step #53.

Step #53: Whether or not the content of the register RGAEBN for the number of times of the automatic exposure bracketing shooting is "0" is discriminated. If this result shows other than "0", as it implies either that the automatic exposure bracketing mode is set in, or that the automatic exposure bracketing shooting is in progress, nothing special is done. Then, the program jumps to the "START". If RGAEBN=0, it implies that a deed of setting the automatic exposure bracketing mode is by now newly done. In this case, the program advances to a step #54.

Step #54: Since the automatic exposure bracketing shooting has newly been set, the register RGAEBN for the number of times of the automatic exposure bracketing shooting is set to "3". Thus, the fact that from now on the automatic exposure bracketing shooting by three frames is to be carried out is memorized. Then, the program advances to a step #55.

Step #55: Discrimination of the flag FME representing whether or not the multiple exposure mode is set in is performed. If not in the multiple exposure mode, the program returns to the "START". If in the multiple exposure mode, the program advances to a step #56.

Step #56: The content of the register RGME for the number of times of the multiple exposure is set to "3". This is because the number of times of the automatic exposure bracketing shooting is previously determined to be "3". Therefore, even if the number of times of the multiple exposure is set in an arbitrary value, it is forcibly set to "3". In this way, mismanagement by the photographer is prevented, and further the danger of making an erroneous exposure is eliminated.

Then, the program returns to the "START".

Also, after the "on" signal of the switch swAEB has once been inputted, the flag FsAB is set to "1" in the step #43. Therefore, even if the "off" signal of the switch swAEB is inputted, the program advances through Step #38 → Step #39 → Step #40 → Step #41 → Step #46, so that the mode in which the automatic exposure bracketing number-of-steps is altered by the dial 5 can continue being sustained to operate. This allows for the photographer to manipulate the dial 5 under the condition that the pushing operation of the switch swAEB is stopped.

Release of the automatic exposure bracketing number-of-steps altering mode can be done by turning on the first stroke switch sw1, or by turning on the switch swCOMP for exposure compensation, or by closing the switch cover 6 to turn off the switch swSET. In more detail, when the "on" signal of the first stroke switch sw1 is inputted, the program advances through Step #1 → Step #2 → Step #3 .... Also, even when the "on" signal of the switch swCOMP for exposure compensation is inputted, the program advances through Step #1 → Step #25 → Step #2 → Step #3 .... In either case, in the step #10, the flag FsAB is reset to "0", and its display is switched to the normal one in the step #11. Also, when the "off" signal of the switch swSET is inputted, in the course of the program: Step #26 → Step #27 → Step #36 → Step #37, the automatic exposure bracketing mark display disappears in the step #36, and the flag FsAB is reset in the step #37. Hence, the advance again to the automatic exposure bracketing number-of-steps altering mode never occurs.

Next, the exposure computation in the automatic exposure bracketing mode is described.

In the case of the shutter priority mode, as has been described in connection with the step #7, the content of the register RGAEB for the automatic exposure bracketing number-of-steps is memorized in the register RGBAv for the automatic exposure bracketing number-of-steps of the aperture. Also, in the case of the aperture priority mode or the manual priority mode, as has been described in connection with the step #23, it is memorized in the register RGBTv for the automatic exposure bracketing number-of-steps of the shutter. In the step #8, since the automatic exposure bracketing mode is in use, because the flag FAEB is set to "1", the program advances to a step #57.

Step #57: Whether or not the content of the aforesaid register RGAEB is zero is discriminated. If its content is zero, it will happen that the same exposure (in the embodiment, the standard exposure) is used in taking all three shots. Since this is meaningless, it is necessary to prohibit the automatic exposure bracketing shooting from occurring. Hence, in this case, the program advances to a step #58.

Step #58: The flag FAEB representing the automatic exposure bracketing mode is reset to "0". Also, the output at the output port PAEB is changed to "0" to turn off the automatic exposure bracketing mark display.

Step #59: Because the automatic exposure bracketing shooting has been prohibited, the content of the register RGAEBN for the number of times of the automatic exposure bracketing shooting is cleared to "0".

By the subsequent advance to the step #9, the exposure computation of the automatic exposure bracketing is not performed, and the flag FsAB is reset to "0". Then, the usual routine is executed.

Meanwhile, if the content of the register RGAEB for the automatic exposure bracketing number-of-steps has been determined in the step #57 not to be zero, it is necessary to perform exposure computation by using that number-of-steps information and to display the automatic exposure bracketing mark. Hence the program advances to a step #60.

Step #60: The output at the output port PAEB is changed to "1", causing the automatic exposure bracketing mark to be displayed. This is because when the switch swSET is turned off by closing the switch cover 6 from the set state of the automatic exposure bracketing mode, the display is completely turned off in the step #36. When the first stroke switch sw1 is turned on, therefore, the mark must be lighted again.

Step #61: Whether or not the first stroke switch sw1 is turned on is discriminated. If turned on, the program advances to a step #62.

Step #62: The content of the register RGTv for shutter information is transferred to and stored in a register RGTvS for shutter information stack, while the content of the register RGAv for aperture information is transferred to and stored in a register RGAvS for aperture information stack. This is because, as, in the automatic exposure bracketing shooting, three shots are taken while simultaneously varying the shutter time or the aperture value, the microcomputer COM, on this event, when controlling the camera, necessitates the shutter time information or the aperture value information obtained before the variation.

Step #63: Since in the step #61, the turning on of the first stroke switch sw1 has been confirmed, the content of the register RGAEBD for display of the automatic exposure bracketing number-of-steps is made to be "000". This is because the display that the first stroke switch sw1 continues being turned on has to be presented in the shooting with the automatic exposure bracketing mode setting as will be more fully described later.

Steps #64 and #65: In these two steps, whether the content of the register RGAEBN for the number of times of the automatic exposure bracketing shooting is "3", or "2", or "1" is discriminated. In other words, what number the next frame to be taken has out of the predetermined three frames for the automatic exposure bracketing shooting is determined. If "RGAEBN=3", as it implies that the first of the predetermined three frames for the automatic exposure bracketing shooting is to be exposed, the program advances from the step #64 to a step #69.

Also, if "RGAEBN=2", as it implies that the second of the predetermined three frames for the automatic exposure bracketing shooting is to be exposed, the program advances through Step #64 → Step #65 → Step #68.

Also, if "RGAEBN=1", as it implies that the last of the predetermined three frames for the automatic exposure bracketing shooting is to be exposed, the program advances through Step #64 → Step #65 → Step #66.

First, a case where content of the register RGAEBN for the number of times of the automatic exposure bracketing shooting is "3" is explained.

Step #69: As has been described above, in the case of "RGAEBN=3", the program advances to this step. The content of the register RGAEB for the automatic exposure bracketing number of steps is subtracted from the content of the register RGCOMP for exposure compensation, and the difference is put into the register RGCOMPD for display of the exposure compensation value. Then, the program advances to a step #70.

Step #70: The content of the register RGAv for aperture information and the content of the register RGBAv for the automatic exposure bracketing number-of-steps of the aperture are added together, and the register RGAv is caused to memorize that sum again. Also, the content of the register RGTv for shutter information and the content of the register RGBTv for the automatic exposure bracketing number-of-steps of the shutter are added together and the register RGTv is caused to memorize that sum again. This means that in the shutter priority mode, the computed aperture information, or in the aperture priority mode, the computed shutter time information, is altered in accordance with the automatic exposure bracketing number-of-steps. That is, suppose the automatic exposure bracketing number-of-steps is set so as not to become a negative value at the time point of the step #50, then the value after the computation in that step #70 becomes the exposure value of the underexposure side in respect to the standard exposure value. Also, in the manual exposure mode, the program passes through the step #23 likewise as in the aperture priority mode. Therefore, the shutter time is altered, while in the conventional camera the aperture value is altered. With the camera of the invention, therefore, it becomes possible to perform the automatic exposure bracketing shooting with the maintenance of the constant field depth, while permitting only the exposure time to vary.

Next, another case where the content of the register RGAEBN for the number of times of the automatic exposure bracketing shooting is "2" is described.

Step #68: As has been described above, in the case of "RGAEBN TM 2", the program advances to this step. The content of the register RGCOMP for the exposure compensation value is transferred to and stored, as it is, in the register RGCOMPD for display of the exposure compensation value.

Since, when shooting the second frame, the exposure is made by the standard value regardless of the automatic exposure bracketing number-of-steps, the shift computation of the shutter time or the aperture value as is done in the step #70 is not carried out. As it stands, the program advances to the step #9 and those that follow.

Next, another case where the content of the register RGAEBN for the number of times of the automatic exposure bracketing shooting is "1" is described.

Step #66: As has been described above, in the case of "RGAEBN=1", the program advances to this step. The content of the register RGCOMP for the exposure compensation value and the content of the register RGAEB for the automatic exposure bracketing number-of-steps are added and together, the result is stored in the register RGCOMPD for display of the exposure compensation value.

Step #67: The content of the register RGAv for aperture information and the content of the register RGBAv for the automatic exposure bracketing number-of-steps of the aperture are put to subtraction, and the register RGAv is caused to memorize that difference again. Also the content of the register RGTv for shutter information and the content of the register RGBTv for the automatic exposure bracketing number of steps of the shutter are put to subtraction, and the register RGTv is caused to memorize that difference again. This means that in the shutter priority mode, the computed aperture information, or in the aperture priority mode, the computed shutter time information, is altered in accordance with the automatic exposure bracketing number-of-steps. Here, conversely to the case of the aforesaid step #70, the value after the computation becomes the overexposure value than the standard exposure value by the automatic exposure bracketing number-of-steps.

Also, if the first stroke switch sw1 has been discriminated in the aforesaid step #61 to be turned off, as it implies that the light measurement timer is in operation, the program advances not past the aforesaid steps #62 to #70 but on a different way: Step #71 → Step #72 → Step #9.

Step #71: Similarly to the step #62, the content of the register RGTv for shutter information is transferred to and stored in the register RGTvS for shutter information stack, and the content of the register RGAv for aperture information is transferred to and stored in the register RGAvS for aperture information stack.

Step #72: The content of the register RGAEB for the automatic exposure bracketing number-of-steps is transferred to and stored in the register RGAEBD for display of the automatic exposure bracketing number-of-steps and the content of the register RGCOMP for the exposure compensation value is transferred to and stored in the register RGCOMPD for display of the exposure compensation value.

A table of the data stored in each register by each processing owing to the above-described flows of the steps #62 to #70 and the steps #71 and #72 is shown in FIG. 13.

With the use of the processed data shown in FIG. 13, as the program further advances in steps, in a step #11, the shutter time display by the indicator SEG1 and the aperture value display by the indicator SEG5 are carried out. In the subsequent step #12, the display owing to the exposure compensation value and the value of the automatic exposure bracketing number-of-steps (step value) is carried out. This display example is explained below.

Now suppose the shutter priority mode is selected by the 2-throw exposure mode switch swSEL, "−1.0" is set as the exposure compensation value, "1/125" is set as the shutter time, an aperture value of "5.6" is obtained by the computation in the step #6, and "1.0" step is set as the automatic exposure bracketing number-of-steps. The methods of setting these values have already been described before. Under this supposition, from FIG. 10(a), the content of the register RGCOMP for the exposure compensation value is "11110", and from FIG. 10(b), the content of the register RGAEB for the automatic exposure bracketing number-of-steps is "010". That the set value of exposure compensation is "−1.0" and the set value of the automatic exposure bracketing number-of-steps is "1.0" step means it takes three exposures with variation of the exposure quantity from the correct value to three discrete values, say, −2 steps underexposure, −1 step underexposure, and the correct exposure.

In the following, concerning the cases 1 to 6 shown in FIG. 13, what displays are presented is described.

Figures 14A, 14B:
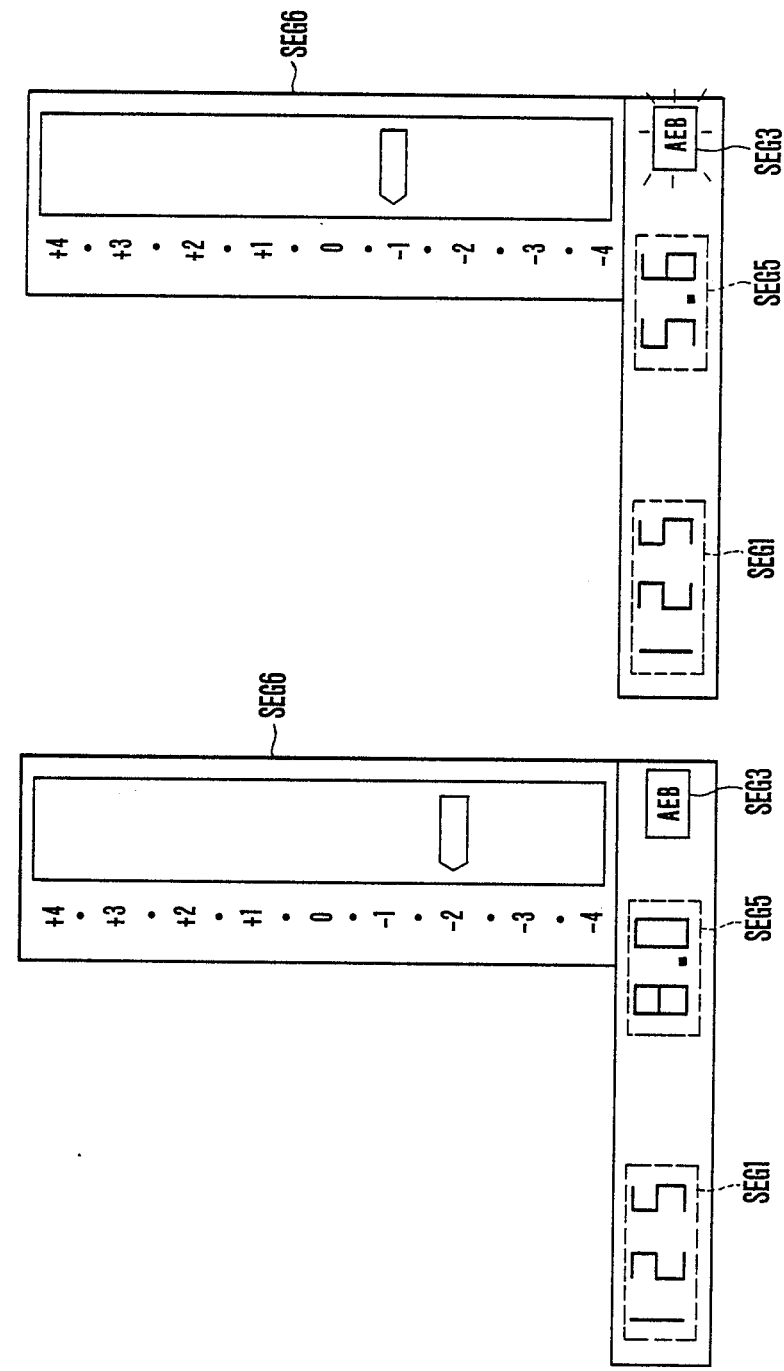

In the case 1 occurring before the exposure of the first one of the predetermined three frames for the automatic exposure bracketing shooting, the content of the register RGCOMPD for display of the exposure compensation value becomes "RGCOMP−RGAEB=11100". Because the content of the register RGAEBD for display of the automatic exposure bracketing number-of-steps is "000", upon execution of a step #12, by the above-described operation of the decoder CD, it is in the indicator SEG6 that only the segment SEG604 is lighted. Further in the indicator SEG1, the denominator of the shutter time, i.e., "125", in the seven-segment form, and in the indicator SEG5, "8.0" corresponding to a more underexposure value than the standard exposure value "5.6" of the automatic exposure bracketing by one step in the automatic exposure bracketing number-of-steps, are displayed. Further, in a step #60, the indicator SEG3 is lighted. As the total display, a display shown in FIG. 14(a) is effected. This display clearly shows up the photographer pushing the first stroke switch sw1 and entering the release wait state of the first one frame of the automatic exposure bracketing shooting that if, without further alternation, the second stroke switch sw2 is pushed to carry out a release operation to be described later, the exposure is made with the control value, say the shutter time of "1/125" and the aperture value of "8.0", and its exposure quantity is −2 steps underexposure in respect to the correct exposure quantity of a case where the exposure compensation and the automatic exposure bracketing are not set.

In the case 2 occurring before the exposure of the second one of the predetermined three frames for the automatic exposure bracketing shooting, the content of the register RGCOMPD becomes equal to "RGCOMP", being "11110", and because the content of the register RGAEBD for display of the automatic exposure bracketing number-of-steps is "000", upon execution of the step #12 likewise as in the aforesaid case 1, the operation of the decoder CD results in that in the indicator SEG6, only the segment SEG606 is lighted. Further, in the indicator SEG1, likewise as in the case 1, the denominator of the shutter time, i.e., "125", is displayed in the seven-segment form. Also, in the indicator SEG5, the standard exposure value for the automatic exposure bracketing, i.e., "5.6", is displayed. Further, in the step #60, "1" is output from the output port PAEB, and, in a step #101 to be described later, "1" is output from the output port PLF. Therefore, the indicator SEG3 blinks. As the total display, what is shown in FIG. 14(b) is presented. This display clearly informs the photographer who has been pushing the first stroke switch sw1 and already enters the release wait state for the second frame for the automatic exposure bracketing shooting, that if, without further alteration, the second stroke switch sw2 is pushed down to perform the release operation to be described later, the exposure will be made with the control value, say the shutter time of "1/125" and the aperture value of "5.6", and its exposure quantity is −1 step underexposure relative to the correct exposure quantity of a case where there is no setting of the exposure compensation and no setting of the automatic exposure bracketing.

In the case 3 occurring before the third of the predetermined three frames for the automatic exposure bracketing shooting, the content of the register RGCOMPD becomes "RGCOMP+RGA-EB=00000", and because the content of the register RGAEBD for display of the automatic exposure bracketing number-of-steps is "000", upon execution of the step #12, the operation of the decoder CD results in that in the indicator SEG6, only the segment SEG608 is lighted. Further, in the indicator SEG1, likewise as above, the denominator of the shutter time, i.e., "125", is displayed. Also, in the indicator SEG5, the standard exposure value of "4.0" for the automatic exposure bracketing is displayed. Further, in the step #60, "1" is output from the output port PAEB and, in the step #101 to be described later, "1" is output from the output port PLF. Therefore, the indicator SEG3 blinks. As the total display, what is shown in FIG. 14(c) is presented. This display clearly informs the photographer who has been pushing the first stroke switch sw1 and already enters the release wait state for the third frame for the automatic exposure bracketing shooting, that if, without further alteration, the second stroke switch sw2 is pushed down to perform the release operation to be described later, the exposure will be made with the control value, say the shutter time of "1/125" and the aperture value of "4.0" and its exposure quantity coincides with the correct exposure quantity the camera has computed.

In the aforesaid case 1, when the first stroke switch sw1 is turned off, the light measurement timer starts and transition to a case 4 occurs. Incidentally, likewise, in the case 2, when the first stroke switch sw1 is turned off, the light measurement timer starts and a case 5 follows, while in the case 3, when the first stroke switch sw1 is turned off, the light measurement timer starts and a case 6 follows. Since the case 4, the case 5 and the case 6 have almost the same display, they are described together.

The cases 4, 5 and 6 result when the photographer releases the first stroke switch sw1 from the depression to enter the light measurement timer operation before the exposure of the first frame of the automatic exposure bracketing shooting, before the exposure of the second frame and before the exposure of the third frame, respectively. In these cases, "RECOMPD=11110" and "RGAEBD=010" are obtained. Upon execution of the step #12, therefore, by the operation of the decoder CD, three of the segments of the indicator SEG6, namely, SEG604, SEG606 and SEG608 are lighted for display. Also, the indicator SEG1 displays "125" as the shutter time information, and the indicator SEG5 displays "5.6" as the aperture value which becomes the standard exposure value of the automatic exposure bracketing. Still likewise, the indicator SEG3 is lighted in the step #60. In total, what is shown in FIG. 14(d) is displayed, except for the case 5 and the case 6 where the display of the indicator SEG3 is changed to the blinking form by the step #101 to be described later. This display clearly shows the photographer who has removed his finger from the first stroke switch sw1 to release the shooting wait state what exposure distribution is set by the settings of the exposure compensation value and the automatic exposure bracketing number-of-steps, and what values the shutter time and the aperture owing to its set standard exposure value take. Even in each of the cases 4, 5 and 6, since, when shooting, the first stroke switch sw1 of the release button is always pushed, the computation of a step #62 and later is performed before the return to the cases 1, 2 and 3, respectively. Therefore, there is no problem in the automatic exposure bracketing shooting. Incidentally, in a case where the automatic exposure bracketing mode is not set in but there is the setting of exposure compensation, the display of the indicator SEG6 changes to such a state as shown in FIG. 12(b) where in order to show the set value of exposure compensation, out of the segments SEG600 to SEG616, only one segment is selected for display, thus becoming the same display state as when the first stroke switch sw1 is pushed to effect the automatic exposure bracketing shooting as shown in FIG. 14(a) to FIG. 14(c). However, because at the time of the automatic exposure bracketing shooting, the indicator SEG3 is lighted, showing that the automatic exposure bracketing goes on, the photographer is never confused.

Next, a case where after the automatic exposure bracketing mode has been set in, the dial 5 is operated to set the bulb exposure mode is described below. The exposure bracketing shooting in the bulb exposure mode is, in principle, meaningless. Therefore, it is advantageous to release the automatic exposure bracketing mode. Hence, if the bulb exposure mode has been determined in a step #31 to be in use, the program advances to a step #73.

73: The output at the output port PAEB is changed to "0" to turn off the display of the automatic exposure bracketing mark. Also the flag FABR of the automatic exposure bracketing mode is reset to "0". Further the content of the register RGAEBN for the automatic exposure bracketing number-of-steps is cleared to "0".

Next, a case where the multiple exposure mode is set in is described. In response to the opening of the switch cover 6, the "on" signal of the switch swME is inputted to advance the flow from the step #39 to a step #74.

Step #74: The flag FsME representing that the multiple exposure switch swME is turned on is set to "1". Also the flag FsAB representing that the automatic exposure bracketing switch swAEB is turned on is reset to "0".

Step #75: The outputs at the output ports PTD, PFL, PAEB, PME, PFD, PBD and PCD are changed to "0" to turn off all display. Then, only the output at the output port PME is changed to "1", causing the indicator SEG4 to display the multiple exposure mode mark.

Step #76: The flag FME representing the multiple exposure mode is set to "1".

Step #77: Whether or not the automatic exposure bracketing mode is in use is discriminated. If the automatic exposure bracketing mode is in use, the program advances to a step #78:

Step #78: Because of the automatic exposure bracketing mode, similarly to the step #56, the number of times of the multiple exposure is forcibly set to "3", in other words, the content of the register RGME for the number of times of the multiple exposure is made to be "3".

If, in the aforesaid step #77, the automatic exposure bracketing mode is not in use, the program advances to a step #79.

Step #79: Similarly to the step #46, the information read routine in accompaniment with the operation of the dial is executed.

Step #80: The content of the register RGME for the number of times of the multiple exposure and the content of the register RGH for dial are added together, and the register RGME is caused again to memorize the sum again. Incidentally, the number of times of the multiple exposure is an integer. If the resolving power of one click of the dial 5 is 0.5 steps, the content of the register RGH for dial must be multiplied by "2" before it is subjected to the addition. Another measure must be taken so that the content of the aforesaid register RGH becomes a negative number. The required steps for them are not shown here.

Step #81: The content of the register RGME for the number of times of the multiple exposure is output from the output port PFD, and the indicator SEG5 is caused to display it.

Then, the program returns to the "START". It is also to be noted that because once the "on" signal of the switch swME is inputted, the flag FsME is set to "1" in the step #74, even if, after that, the "off" signal of the switch swME is inputted, the program advances through Step #39 → Step #40 → Step #77, thus making it possible to sustain the mode of setting the number of times of multiple exposure. Incidentally, to effect transitions from the automatic exposure bracketing number-of-steps altering mode to the multiple exposure number-of-times setting mode, one-time closure of the switch swME is sufficient. Also for the reverse transition too, one-time closure of the switch swAEB suffices. These are understood even from the flow of FIGS. 3(a) and 3(b).

Next, in a case where the number of times of multiple exposure has once been set and then the number of times of multiple exposure is made zero (0), it is necessary to release the multiple exposure mode and turn off the multiple exposure mark. This program, because the flag FME has been set to "1" in the step #9, is performed by advancing to a step #82.

Step #82: If the content of the register RGME for the number of times of multiple exposure is zero, the program advances to a step #83.

Step #83: The flag representing the multiple exposure mode is reset to "0". Also the output at the output port PME is changed to "0" to turn off the display of the multiple exposure mark.

If, in the aforesaid step #82, the content of the register RGME for the number of times of multiple exposure is not zero, the program advances to a step #84.

Step #84: The output at the output port PME is changed to "1" to display the multiple exposure mark. This is because all display has been turned off in the step #36. When the pushing of the first stroke of the release button 1 is performed again, the photographer is informed of the fact that the multiple exposure mode is operating.

In such a way, the stage of preparation to the shooting is complete.

Next, that sequence which follows after the pushing of the second stroke of the release button 1 is described. As the release button 1 has been pushed to the second stroke, when an "on" signal (release signal) of the second stroke switch sw2 is supplied to the input port PA1, the program advances from the step #20 of FIG. 3(a) to a step #100 of FIG. 4(a).

Step #100: Whether or not the automatic exposure bracketing mode is set is discriminated on the basis of the state of the flag FAEB. If the automatic exposure bracketing mode is in use, the program advances to a step #101. Otherwise, the program advances to a step #102.

Step #101: The output at the output port PFL is changed to "1", causing the indicator SEG3 to blink the display of the automatic exposure bracketing mark. By this display the photographer knows that the automatic exposure bracketing shooting is started.

Step #102: Whether or not the "on" signal of the switch swSELF is inputted to the input port PA6 is discriminated. If the "on" signal is being inputted, as it implies that the shooting is by the self timer, the program advances to a step #103. Otherwise, the program advances to a step #104.

Step #103: 10 seconds are counted by the self timer.

Step #104: The content of the register RGAv for aperture information is output from the output port PAV. In receipt of this, the drive circuit DAV for aperture control converts the content of the aforesaid register RGAv into actual aperture information and starts aperture control through the actuator CAV for diaphragm driving such as a stepping motor.

Step #105: A pulse signal is output from the output port PE0, so that the transistor TR0 is turned on to supply a current to the combination magnet of the first latch, i.e., the magnet MG0 for mirror-up. By this, the mirror is moved upward by a publicly known spring power.

Step #106: Whether or not the "on" signal of the switch swMRUP which detects the mirror-up completion is inputted to the input port PA2 is discriminated. In here, during the time until the "on" signal is inputted, or until the mirror is fully moved upward, this loop is repeated. When the mirror-up is completed, the program advances to a step #107.

Step #107: Because the content of the register RGTv for shutter information has an APEX value, it is converted (expanded) into actual time data.

Step #108: The pulse signal is output from the output port PE1 to turn on the transistor TR1 to energize the magnet MG1 for the leading shutter curtain. By this, the leading curtain of the shutter runs.

Step #109: Whether or not the content of the register RGTM represents the bulb mode is discriminated. If the bulb mode, the program advances to a step #110. Otherwise, the program advances to a step #111.

Step #110: The input of the "off" signal of the second stroke switch sw2 is waited for. This is because in the bulb mode, the shutter must be maintained open so long as the "on" signal of the second stroke switch sw2 is inputted.

Step #111: Because the bulb mode is not in use, actual time counting with the data expanded in the step #107 is carried out so that the computed shutter time is measured.

Step #112: When the actual time counting terminates, a pulse signal is output from the output port PE2 to turn on the transistor TR2 to energize the magnet MG2 for the trailing curtain of the shutter. By this operation, the trailing curtain of the shutter runs.

Step #113: Whether or not the "on" signal of the shutter trailing curtain switch swCN2 is inputted to the input port PA5 is discriminated. Here, during the time until the "on" signal is inputted, or until the running of the trailing curtain of the shutter is completed, this loop is repeated. When it is completed, the program advances to a step #114.

Step #114: The output at the output port PAV is changed to "0". By this operation, the diaphragm returns to the full open aperture state.

Step #115: The output of the output port PD is changed to "1" to turn on the transistor TR3 to rotate the charging motor MD for mirror-down and shutter charging.

Step #116: Whether or not the multiple exposure mode is set is discriminated on the basis of the state of the flag FME. If the multiple exposure mode is in use, the program advances to a step #117. Otherwise, the program advances to a step #120.

Step #117: "1" is subtracted from the content of the register RGME for the number of times of multiple exposure, and the difference is memorized in the aforesaid register RGME again.

Step #118: Whether or not the content of the register RGME for the number of times of multiple exposure is zero is discriminated. If it is zero, the program advances to a step #119. If it is not zero, the program advances to a step #121.

Step #119: That the content of the register RGME for the number of times of multiple exposure is zero means that the multiple exposure has been completed. Therefore, the flag FME representing the multiple exposure mode is reset to "0". Also, the output at the output port PME is changed to "0" to turn off the multiple exposure mark display.

Step #120: The timer for film transport is started. Also, the output at the output port PB is changed to "1" to turn on the transistor TR5 to rotate the motor MB for film transport.

In a case where the multiple exposure mode is continued, the content of the register RGME for the number of times of multiple exposure is not zero. Therefore, the program advances from the step #118 to a step #121. Because the program does not pass through the step #120, the film transport never takes place. Therefore, the multiple exposure is performed. Also, when the multiple exposure terminates, the content of the aforesaid register RGME becomes zero. Therefore, as has been described above, after the multiple exposure mode has been released, the film transport is carried out in the step #120.

Step #121: Whether or not the "on" signal of the switch swCGE for detecting the completion of the charging is inputted to the input port PA3 is discriminated. If the "on" signal is not inputted, or the charging is not completed, the program advances to a step #123. When the charging is completed, the program advances to a step #122.

Step #122: Because the charging has been completed, the output at the output port PD is changed to "0" to cut off the supply of a current to the motor MD for charging.

Step #123: Whether or not the "on" signal of the switch swFLM which is turned on each time one-frame transport of the film is completed is inputted to the input port PA4 is discriminated. If the "on" signal is not inputted, or the one-frame transport of the film is not completed, the program advances to a step #124. When completed, the program advances to a step #125.

Step #124: The state of the timer for film transport is discriminated. Because, when the film is used up, no more film transport can be performed, there is no possibility of the aforesaid switch swFLM turning on. In such an event, the timer for the film transport in the form of, for example, a 1 sec. timer starts counting time. When the time counting is completed, the program advances to a step #150. If not completed, the program returns to the step #121, and repeats the foregoing sequence (Step #121 → Step #123).

Step #125: When the input of the "off" signal of the switch swFLM is detected in the step #123, the output at the output port PB is changed to "0" to turn off the transistor TR5 to thereby stop the motor MB for film transport.

Step #126: Whether or not the automatic exposure bracketing mode is set is discriminated on the basis of the state of the flag FAEB. If the automatic exposure bracketing mode is not in use, the program advances to a step #135. If so, the program advances to a step #127.

Step #127: The content of the register RGTvS for shutter information stack is transferred to and stored in the register RGTv for shutter information. Likewise, the content of the register RGAvS for aperture value information stack is transferred to and stored in the register RGAv for aperture value information. By this operation the shutter time information and the aperture value information which become the exposure quantity of the standard exposure value obtained before the bracketing computation is performed return to the aforesaid register RGTv and the aforesaid register RGAv, respectively.

Step #128: "1" is subtracted from the content of the register RGAEBN for the number of times of the automatic exposure bracketing shooting, and the difference is memorized again in the aforesaid register RGAEBN.

Step #129: Whether or not the content of the aforesaid register RGAEBN decremented by "1" in the aforesaid step #128 becomes "0" is discriminated. If the content of this register RGAEBN is "0", as it implies that the exposures of the three frames set in the automatic exposure bracketing shooting have ended, the program advances to a step #132. Otherwise, the program advances to a step #130.

Step #130: Whether the continuous shooting mode or the single shooting mode is in use is discriminated on the basis of the on-off state of the switch swCS inputted to the input port PA7. If the continuous shooting mode, the program jumps to "NEXT3" (the step #8 of FIG. 3(a)). If the single shooting mode, the program advances to a step #131.

Step #131: The input of the "off" signal of the second stroke switch sw2 is waited for. Because of the single shooting mode, until the photographer once releases the second stroke switch sw2 from the "on" state by freeing the release button 1, the program cannot advance to the next sequence. When the "off" signal is inputted, the program jumps to "NEXT3".

The jump of the program from the step #130 or #131 to the "NEXT3" occurs under the condition that the automatic exposure bracketing shooting is in progress, so that the predetermined three frames for the automatic exposure bracketing shooting have not yet been exposed. By the jump to the "NEXT3", without having to do a new light measurement computation, the computation for shifting the exposure based on the automatic exposure bracketing number-of-steps is carried out, permitting the next exposure to succeed, as is similar to that described in connection with the automatic exposure bracketing computation in the steps #62 to #70.

When the predetermined three frames for the automatic exposure bracketing shooting have been determined in the aforesaid steps #129 to have been exposed, the program advances to the step #132 as has been described above.

Step #132: "0" is output from the output port PFL. By this the blinking of the indicator SEG3 is stopped, and the ordinary lighting state is obtained.

Step #133: The data of "3" is set in the register RGAEBN for the number of times of the automatic exposure bracketing shooting. By this, three new frames for the automatic exposure bracketing shooting become possible to shoot.

Step #134: The input of the "off" signal of the second stroke switch sw2 is waited for. Because it is now that all the predetermined three frames for the automatic exposure bracketing shooting have just been exposed, regardless of whether the camera is in the single shooting mode or the continuous shooting mode set by the switch swCS connected to the input port PA7, the photographer must be informed of the fact that one series of continuous shots has finished. For this purpose, the program is prevented from going further to the next shot, so long as the photographer once turns off the second stroke switch sw2 by freeing the release button 1.

When the "off" signal of the second stroke switch sw2 is inputted, the program jumps to the "START".

Next, the case of no automatic exposure bracketing mode is described. Because, in this case, the flag FAEB is "0", the program advances from the step #126 to a step #135.

Step #135: Whether the continuous shooting mode or the single shooting mode is in use is discriminated on the basis of the on-off state of the switch swCS inputted to the input port PA7. If the continuous shooting mode, the program returns to the "START". In this case, the pushing operation of the release button 1 is kept, so that the "on" signals of the first and second stroke switches sw1 and sw2 are being inputted. Therefore, the program begins the next shooting. If the single shooting mode, the program advances to a step #136.

Step #136: The input of the "off" signal of the second stroke switch sw2 is waited for. Because of the single shooting mode, until the photographer once turns off the second stroke switch sw2 by freeing the release button 1, the program cannot advance to the next sequence. When the "off" signal is inputted, the program returns to the "START".

Next, a case where the filming ends at a time during the shooting is described. Because, in this case, the time counting ends in the film timer, for example, 1 sec. timer, as has been described above, the program advances from the step #124 to a step #150.

Step #150: The output at the output port PC is changed to "1" to turn on the transistor TR4 to rotate the motor MC for rewinding. By this, rewinding of the film is started.

Step #151: A rewind timer used to detect whether or not the rewinding of the film has ended is started.

Step #152: Whether or not the state of the film switch swFLM has changed is discriminated. If so, the program returns to the step #151, causing the rewind timer to start again. If there is no change, the program advances to a step #153.

Step #153: Whether or not the time counting in the film timer has terminated is discriminated. If not terminated, the program returns to the step #152.

As will be seen from the foregoing, for the time of transport between two successive frames, the program advances along the loop of the step #152 and the step #153. Upon detection of the completion of one-frame transport, the program advances from the step #152 to the step #151. When rewinding the film, this loop is repeated. After that, when all the film is rewound into the film cartridge, a sprocket, for example, no longer rotates, so that the state of the film switch swFLM gets stopped from further changing. Upon detection of this, the program advances to a step #154.

Step #154: The output at the output port PC is changed to "0" to turn off the transistor TR4 to stop the motor MC for rewinding. By this, the rewinding of the film ends.

Step #155: The flag FAEB representing the automatic exposure bracketing mode is reset to "0". Also, the content of the register RGAEBN for the number of times of the automatic exposure bracketing shooting is cleared to "0". Further, the outputs at the output ports PAEB and PFL both are changed to "0" to turn off the blinking display of the indicator SEG3 (automatic exposure bracketing mark).

Step #156: The contents of the register RGAEB for the automatic exposure bracketing number-of-steps and the register RGAEBD for display of the automatic exposure bracketing number-of-steps both are cleared to "000". Further, the content of the aforesaid register RGAEBD is output to the output port PBD.

Then, the program returns to the "START".

Also, if it happens that the filming ends at a time during the automatic exposure bracketing shooting, that is, despite the duty of taking three frames in series, no more fresh frames of the film becomes available in the middle of the course, the program is caused to enter the routine that follows the step #150 at the end of exposure of the first frame or the second frame. In such a case, the continuance of the automatic exposure bracketing shooting to the newly loaded film leads to a danger that the object differs, or a possibility for the photographer to misunderstand. It is therefore desirable to inform the photographer of it and at the same time to release the automatic exposure bracketing mode. Referring to the flowchart of FIG. 4(a), when the filming has ended after the blinking display of the automatic exposure bracketing mark has been made in the step #101, automatic transition to the film rewinding takes place. During the performance of this film rewinding, the blinking display of the automatic exposure bracketing mark is not yet released. Therefore, the persistence of the automatic exposure bracketing mark display that, if normal, never appears during the film rewinding, allows the photographer to know that the film has been used up before the automatic exposure bracketing shooting is fully completed. That is, it becomes a warning display. Also, since in the step #155, the flag FAEB representing the automatic exposure bracketing mode is reset to "0" and the content of the register RGAEBN for the number of times of the automatic exposure bracketing shooting is also cleared to "0", there is no such problem that the remaining of the automatic exposure bracketing shooting is transferred to the newly loaded film as in the conventional camera.

According to the present embodiment, provision is made so that during the operation of the light measurement timer where the pushing of the first stroke is not performed, all pieces of the automatic exposure bracketing number-of-steps information (exposure number-of-steps information) by a predetermined number of times of the automatic exposure bracketing shooting are displayed, and then when waiting for a release actuation with the pushing of the first stroke performed, only that piece of the automatic exposure bracketing number-of-steps information (exposure number-of-steps information) which is assigned to the next shot is displayed. Therefore, even when the one-sided setting or center-shifted setting has been done, the photographer can easily know its set situation and under what condition the next frame to be shot is exposed.

What is claimed is:

1. A bracketing exposure control device for controlling an exposure operation of each of a plurality of film frames with respective different exposure levels, said device comprising:
   (a) a plurality of display elements arranged in a line, a specific display element of said plurality of display elements being provided for displaying a reference exposure level and the remaining ones of said plurality of display elements being provided for displaying an amount of deviation of a respective exposure level from the reference exposure level;
   (b) an exposure compensation value setting means for setting a compensation value;
   (c) a designating circuit for designating said specific display element based on a difference between the exposure compensation value and an exposure level for each frame, said circuit designating each of said elements corresponding to the amount of deviation of each exposure level for each frame from said reference exposure level when said compensation value is set at zero, and also for designating, when the compensation value is not set at zero, each of such elements that deviates by the compensation value from each of said elements which was designated when the compensation value is set at zero; and
   (d) an element driving circuit for effecting an operation instruction to each of said elements designated by said designating circuit.

2. A camera having a bracketing circuit which effects an exposure of each one of a plurality of frames of film with respectively different exposure levels, said camera comprising:
   (a) a plurality of display elements arranged in a line, a specific display element of said plurality of display elements being provided for displaying a reference exposure level and each of the remaining ones of said plurality of display elements being provided for displaying an amount of deviation from the reference exposure level;
   (b) a first setting circuit for setting an amount of deviation from a reference exposure level for each frame for bracketing exposure;
   (c) a second setting circuit in which a compensation value is manually set independently from the amount of deviation set at said first setting circuit;
   (d) a summing circuit which determines for each frame a total amount of deviation as obtained by summing the compensation value set at the second setting circuit and the amount of deviation set for each frame by said first setting circuit; and
   (e) a driving circuit designating such element as corresponding to each amount of total deviation determined by said summing circuit, thus placing the designated element in an operative state;
   wherein said bracketing circuit effects an exposure at an exposure level for each frame according to the total amount of deviation determined by said summing circuit.

3. A camera according to claim 2, further comprising a manual operation member for manually setting an amount of deviation of said first setting circuit.

4. A camera according to claim 2, wherein said reference exposure level is a normal exposure level.

5. A camera comprising:
   (a) a setting circuit for setting deviation information relative to a reference exposure level for bracketing exposure;
   (b) a bracketing exposure control circuit which shifts, in turn, an exposure level for each frame relative to the reference exposure level according to the deviation information set at said setting circuit, and effects a bracketing exposure of each frame by respectively varying the exposure level for each frame; and
   (c) a display circuit having a first display mode displaying all of the amounts of shifting from the reference exposure level which are made by said bracketing exposure control circuit for all frames, and a second display mode which displays only that amount of shifting from the reference exposure level for a specific frame.

6. A camera according to claim 5, further comprising a changeover circuit which changes over a display mode of said display circuit according to an operating state of a release actuating member.

* * * * *

UNITED STATES PATENT AND TRADEMARK OFFICE
CERTIFICATE OF CORRECTION

PATENT NO. : 4,974,012
DATED : November 27, 1990
INVENTOR(S) : Toshifumi Ohsawa

It is certified that error appears in the above-identified patent and that said Letters Patent is hereby corrected as shown below:

FIG.13  (Sheet 14):

Box "DSPLAY OF STANDARD EXPOSURE" should read
       --DISPLAY OF STANDARD EXPOSURE--.

COLUMN 3:

Line 36, "indicating" should read --indicating the--.

COLUMN 5:

Line 12, "is" (first occurrence) should read --is,--.

Line 35, "is" (first occurrence) should read --is,--.

COLUMN 25:

Line 33, "transitions" should read --transition--.

Signed and Sealed this

Twenty-second Day of September, 1992

Attest:

DOUGLAS B. COMER

Attesting Officer          Acting Commissioner of Patents and Trademarks